(12) United States Patent
McDougal et al.

(10) Patent No.: US 9,003,532 B2
(45) Date of Patent: Apr. 7, 2015

(54) PROVIDING A NETWORK-ACCESSIBLE MALWARE ANALYSIS

(75) Inventors: Monty D. McDougal, St. Paul, TX (US); Bradley T. Ford, Wylie, TX (US); William E. Sterns, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/233,804

(22) Filed: Sep. 15, 2011

(65) Prior Publication Data

US 2013/0074185 A1     Mar. 21, 2013

(51) Int. Cl.
*H04L 29/06* (2006.01)
*G06F 21/56* (2013.01)

(52) U.S. Cl.
CPC ...................... *G06F 21/561* (2013.01)

(58) Field of Classification Search
None
See application file for complete search history.

(56) References Cited

U.S. PATENT DOCUMENTS

| | | | |
|---|---|---|---|
| 5,623,600 | A | 4/1997 | Ji |
| 6,721,721 | B1* | 4/2004 | Bates et al. ........................... 1/1 |
| 7,099,916 | B1* | 8/2006 | Hericourt et al. ............. 709/203 |
| 7,376,842 | B1* | 5/2008 | Hursey ........................... 713/188 |
| 8,181,245 | B2* | 5/2012 | Tripathi et al. ................. 726/22 |
| 2004/0158741 | A1 | 8/2004 | Schneider |
| 2006/0259974 | A1* | 11/2006 | Marinescu et al. ............. 726/25 |
| 2007/0028302 | A1* | 2/2007 | Brennan et al. .................. 726/24 |
| 2007/0028303 | A1* | 2/2007 | Brennan ........................... 726/24 |
| 2007/0028304 | A1* | 2/2007 | Brennan .......................... 726/24 |
| 2008/0320548 | A1* | 12/2008 | Tripathi et al. .................... 726/1 |
| 2009/0282483 | A1 | 11/2009 | Bennett |
| 2010/0192222 | A1* | 7/2010 | Stokes et al. ..................... 726/22 |
| 2010/0251329 | A1* | 9/2010 | Wei ................................... 726/1 |
| 2011/0047597 | A1* | 2/2011 | Mahaffey et al. .................. 726/3 |
| 2011/0047620 | A1* | 2/2011 | Mahaffey et al. ............... 726/23 |
| 2011/0145920 | A1* | 6/2011 | Mahaffey et al. ............... 726/22 |
| 2011/0219451 | A1 | 9/2011 | McDougal et al. |
| 2012/0233695 | A1* | 9/2012 | Mahaffey et al. ............... 726/23 |
| 2012/0290640 | A1* | 11/2012 | Mahaffey et al. ............. 709/203 |

OTHER PUBLICATIONS

Cyber-TA Research and Development Project, "EUREKA! An Automated Malware Binary Analysis Service", Jul. 29, 2010, http://eureka.cyber-ta.org, accessed Jun. 13, 2010 via http://web.archive.org/web/20100729000602/http://eureka.cyber-ta.org/, p. 1.*
Nabholz, Bradley, "Design of an Automated Malware Analysis System", Apr. 13, 2010, Purdue University, p. 1-40.*
"Microsoft Computer Dictionary", 5th ed., definition of "web services", Microsoft Press, 2002, p. 710 of 791.*
Newton, Harry, "Newton's Telecom Dictionary", 20th ed., definition of "web services", CMP Books, 2004, p. 913.*

(Continued)

*Primary Examiner* — Jeffery Williams
(74) *Attorney, Agent, or Firm* — Schwegman Lundberg & Woessner, P.A.

(57) ABSTRACT

In certain embodiments, a computer-implemented method comprises receiving, via a computer network and from a first computer system, a first malware analysis request. The first malware analysis request comprises a file to be analyzed for malware by a malware analysis system. The method includes initiating a malware analysis by the malware analysis system of the first file for malware. The method includes communicating to the first computer system a response for the first file determined by the malware analysis system to the first computer system. The response comprises an indication of whether the first file comprises malware.

10 Claims, 7 Drawing Sheets

(56) References Cited

OTHER PUBLICATIONS

"International Application Serial No. PCT/US2012/055116, International Search Report mailed Nov. 23, 2012", 2 pgs.

"International Application Serial No. PCT/US2012/055116, Written Opinion mailed Nov. 23, 2012", 5 pgs.

"International Application Serial No. PCT/US2012/055116, International Preliminary Report on Patentability mailed Mar. 27, 2014", 7 pgs.

* cited by examiner

PROVIDING A NETWORK-ACCESSIBLE MALWARE ANALYSIS

BACKGROUND

Malware (such as viruses, trojans, and other malicious software) has become increasingly more difficult to contest. Various methods have been used to combat malware, but more sophisticated malware continues to abound. Methods of detection have grown more complex, but often take longer to execute due to this complexity. Malware protection techniques applied in certain computer systems often lack the complexity or other sophistication to detect or otherwise address certain types of malware such as zero-day attacks and other types of malware.

SUMMARY

In certain embodiments, a computer-implemented method comprises receiving, via a computer network and from a first computer system, a first malware analysis request. The first malware analysis request comprises a file to be analyzed for malware by a malware analysis system. The method includes initiating a malware analysis by the malware analysis system of the first file for malware. The method includes communicating to the first computer system a response for the first file determined by the malware analysis system to the first computer system. The response comprises an indication of whether the first file comprises malware.

Particular embodiments of the present disclosure may provide one or more technical advantages. Certain embodiments allow computer systems to access malware analysis services provided by a malware analysis system by invoking those malware detection services using a web services interface. Embodiments of the present disclosure may provide a network-accessible interface, which may be a universal interface, to a malware analysis system and its associated data repository of historical malware analyses. Providing a web services interface for communicating with the malware analysis system may ease the use of such a system, thereby potentially encouraging its use. Communication of files to a remote malware analysis system for analysis may allow for more robust malware analysis to be performed than might be possible or practical with typical host-based or other local malware analysis systems. In certain embodiments, the remote malware analysis system further provides a mechanism for a human analyst to contribute to the malware analysis of certain files, if appropriate.

Certain embodiments of the present disclosure may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1:
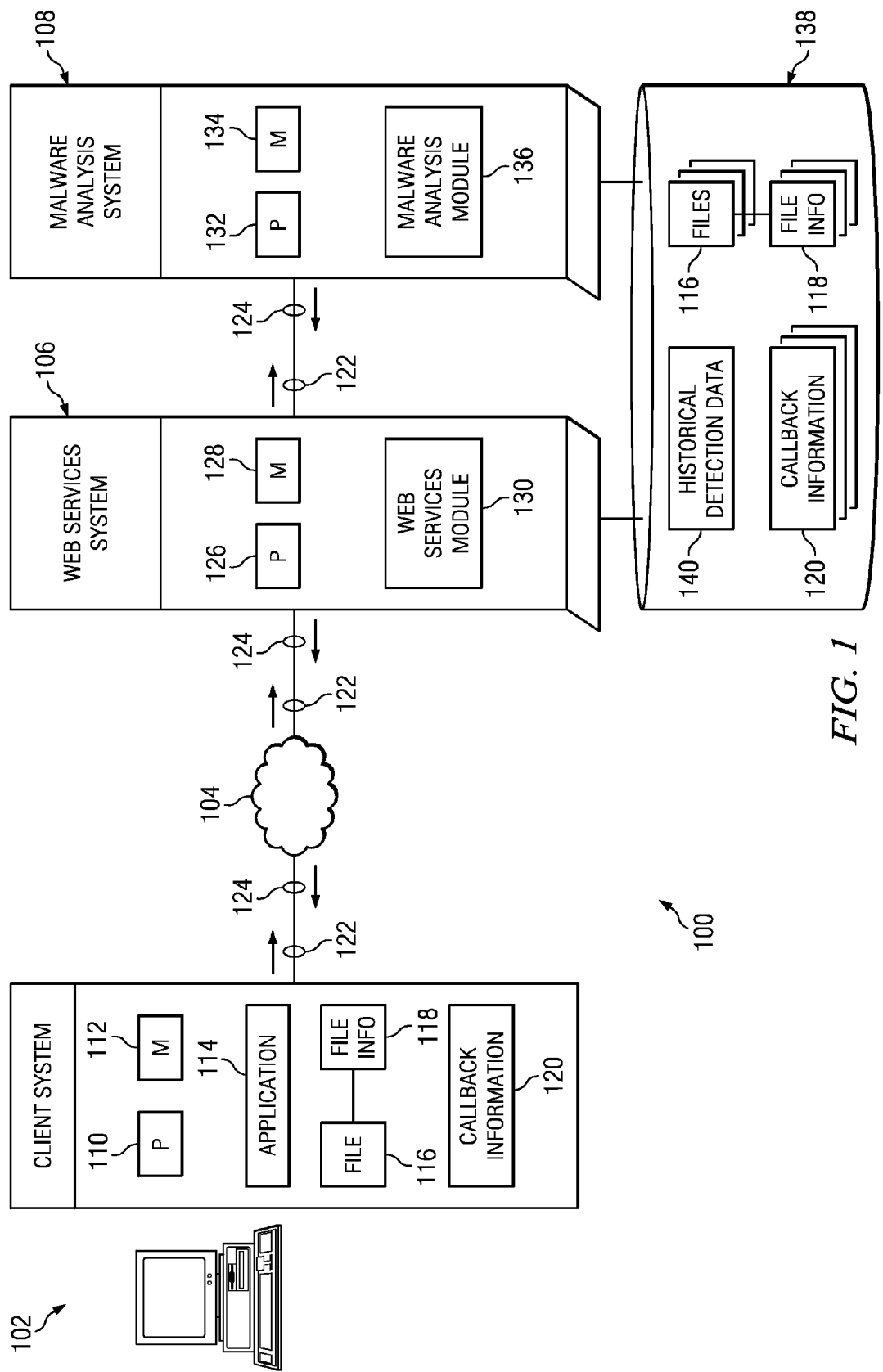
FIG. 1 illustrates an example system for providing a network-accessible malware analysis, according to certain embodiments of the present disclosure.

FIG. 1 illustrates an example system 100 for providing a network-accessible malware analysis, according to certain embodiments of the present disclosure. In the illustrated example, system 100 includes a client system 102, a computer network 104, a web services system 106, and a malware analysis system 108. Although system 100 is illustrated and primarily described as including particular numbers and types of components arranged in a particular manner, the present disclosure contemplates system 100 including any suitable numbers and types of components arranged in any suitable manner, according to particular needs.

Embodiments of system 100 implement a web service interface for malware analysis. Although described as a "web service" or "web service interface," the present disclosure contemplates malware detection services being provided via a computer network 104 in any suitable manner. In general, client system 102 determines that one or more files should be analyzed for malware and requests using a web services interface analysis of those files by malware analysis system 108. Details of certain example embodiments of the present disclosure are described below. In certain embodiments, the web services interface provides a universal messaging format for communicating between client systems 102 and malware analysis system 108.

Client system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more cellular/smart phones, one or more servers, a server pool, a network gateway, a router, a switch, one or more processors within these or other devices, or any other suitable processing device. Client system 102 may be a stand-alone computer or may be a part of a larger network of computers associated with an entity. Client system 102 may be implemented using any suitable combination of hardware, firmware, and software. "Client system 102" and "user of client system 102" may be used interchangeably throughout this description. Client system 102 may be one of a number of client systems 102.

Client system 102 may include a processing unit 110 and a memory unit 112. Processing unit 110 may include one or more microprocessors, controllers, or any other suitable computing devices or resources. Processing unit 110 may work, either alone or with other components of system 100, to provide a portion or all of the functionality of its associated computer system 102 described herein. Memory unit 112 may take the form of volatile or non-volatile memory including, without limitation, magnetic media, optical media, read-access memory (RAM), read-only memory (ROM), removable media, or any other suitable memory component.

Client system 102 may include an application 114, which may be implemented using any suitable combination of hardware, firmware, and software. Client system 102 also may include file 116, file information 118, and callback information 120. Each of these is described in greater detail below.

Application 114 may include any suitable application (or combination of applications) that is operable to access a computer network, such as the Internet, and to initiate a web services call to web services system 106 to request that malware analysis system 108 analyze file 116. Application 114 may be configured to interface with web services module 130 of web services system 106. In certain embodiments, a portion or all of application 114 may include a web service (e.g., that may be distinct from the web service provided by web services system 106).

Application 114 may be operable to communicate various types of malware analysis requests 122. These malware analysis requests 122 may be implemented as web services requests. Malware analysis requests 122 may include status requests, file analysis requests, a callback request, and any other suitable types of requests. For example, a status request may be a synchronous request. As another example, a file analysis request with a callback request may be an asynchronous request. These example malware analysis requests 122 are described in greater detail below. Application 114 may be operable to receive results 124, from web services system 106 and/or malware analysis system 108 for example. In certain embodiments, results 124 may include an indication of whether or not a file 116 submitted to be analyzed for malware is determined by malware analysis system 108 to be malware.

In certain embodiments, application 114 is operable to access one or more policies to determine whether to initiate malware analysis request 122 (e.g., as a web services request) for malware analysis system 108 to perform a malware analysis of file 116. For example, these policies may filter which files 116 are communicated to malware analysis system 108 (via a web services request) to be analyzed for malware.

Files 116 may have any suitable format, according to particular needs. For example, file 116 may include one or more of the following in any suitable combination: (1) a data file; (2) a data record; (3) an email message; (4) an attachment to an email message; (5) a Uniform Resource Locator (URL) or other suitable address identifier; and (6) any other suitable target object for which malware detection may be appropriate. In some embodiments, the term file as used herein may refer to a collection of files. For example, a ZIP file or other archive or compressed file type may include multiple embedded files. The present disclosure contemplates client system 102 having any suitable number of files 116 and requesting that malware analysis system 108 perform a malware analysis of any suitable number of files 116.

File information 118 may include any suitable combination of an identifier for client system 102 (e.g., an IP address, a user name, a machine identification number, and/or any other suitable identifying information), a file type of file 116, a hash value (or other identifier) computed from file 116, timestamp information associated with the addition of file 116 to client system 102 (and/or any other suitable time information), an identification of a manner in which file 116 was added to client system 102, an identification of one or more policies (e.g., of client system 102 and/or an entity associated with client system 102) that resulted in file 116 being communicated to remote malware analysis system 108, and any other suitable information. File information 118 may be included in certain malware analysis requests 122, as described in greater detail below.

The hash value of file 116 may provide a reasonably reliable identifier for file 116. In certain embodiments, application 114 is operable to compute the hash value and any other suitable file information. For example, application 114 may generate one or more hashes of content of file 116 (such as any suitable combination of a checksum, an MD5 hash, a SHA1 hash, and any other suitable type of hash).

Callback information 120 may include any suitable information that may be used by web services system 106 and/or malware analysis system 108 to communicate a message to client system 102. For example, callback information 120 may include any suitable combination of an IP address of client system 102, a port number of client system 102, and any other suitable information that can be used by web services system 106 and/or malware analysis system 108 to communicate a message to client system 102. As described below, client system 102 may provide a portion or all of callback information 120 to web services system 106 and/or malware analysis system 108 to request a return communication from web services system 106 and/or malware analysis system upon completion of the malware analysis of file 116 (or at any other suitable point depending on the configuration of system 100).

Computer network 104 facilitates wireless or wireline communication. Computer network 104 may communicate, for example, IP packets, Frame Relay frames, Asynchronous Transfer Mode (ATM) cells, voice, video, data, and other suitable information between network addresses. Computer network 104 may include one or more local area networks (LANs), radio access networks (RANs), metropolitan area networks (MANs), wide area networks (WANs), mobile networks (e.g., using WiMax (802.16), WiFi (802.11), 3G, 4G, or any other suitable wireless technologies in any suitable combination), all or a portion of the global computer network known as the Internet, and/or any other communication system or systems at one or more locations, any of which may be any suitable combination of wireless and wireline.

Web services system 106 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones, one or more servers, a server pool, switch, router, disks or disk arrays, one or more processors within these or other devices, or any other suitable processing device. Web services module 106 may be a stand-alone computer or may be a part of a larger network of computers associated with an entity. In certain embodiments, web services system 106 is a proxy server.

Web services system 106 may include a processing unit 126 and a memory unit 128. Processing unit 126 may include one or more microprocessors, controllers, or any other suitable computing devices or resources. Processing unit 126 may work, either alone or with other components of system 100, to provide a portion or all of the functionality of its associated web services system 106 described herein. Memory unit 128 may take the form of volatile or non-volatile memory including, without limitation, magnetic media, optical media, RAM, ROM, removable media, or any other suitable memory component.

Web services system 106 may comprise a web services module 130, which may be implemented in any suitable combination of hardware, firmware, and software. Web services module 130 may implement a web services interface for communication between client system 102 and malware analysis system 108. In certain embodiments, web services module 130 provides a universal interface to malware analysis system 108, allowing an external application (e.g., application 122) to make use of the malware analysis capabilities of malware analysis system 108. The external application (e.g., application 122) also may take advantage of the storage capabilities associated with web services system 106 and/or malware analysis system 108 (e.g., storage module 132, described below) for storing historical malware data associated with previous malware analyses. In certain embodiments, web services module 130 may implement the web services interface using web service technology such as Simple Object Access Protocol (SOAP) Remote Procedure Calls (RPCs), Representational State Transfer (REST), Web RPC, Asynchronous JavaScript and Extensible Markup Language (AJAX)-based Application Programming Interfaces (APIs), and/or other suitable network-based APIs.

Web services module 130 may implement a variety of communications between client system 102 and malware analysis system 108. For example, web services module 130 may provide for a synchronous mechanism for client system 102 to request a status of a malware analysis of a file 116. As another example, web services module 130 may provide for an asynchronous mechanism for uploading single or multiple files 116 for a malware analysis to be performed on those file(s) 116 by malware analysis system 108. Web service module 130 then optionally may call back to client system 102 (e.g., using callback information 120) upon completion of the malware analysis of the file 116 with the results of the malware analysis. These example communications are described in greater detail below following the description of the other components of system 100.

Malware analysis system 108 may include any processing system operable to analyze one or more files 116 for malware. For example, malware analysis system 108 may analyze files 116 for malware in response to a malware analysis request 122 from client system 102. Malware analysis system 108 may return the results (e.g., as a results 124) of the analysis of the files 116 for malware to client system 102.

In certain instances, malware analysis system 108 may identify a file 116 as being and/or containing (terms and their variations of which may be used interchangeably throughout this disclosure) malware if the file 116 includes any of a variety of forms of hostile or intrusive computer-readable logic designed to infiltrate a computer system. Particular forms of malware may include computer viruses, worms, trojan horses, spyware, adware, scareware, crimeware, rootkits, and other malicious and/or unwanted software. Malware may be designed to disrupt or deny operation of a computer system, gather information from a computer system (e.g., that leads to a loss of privacy or exploitation), gain unauthorized access to computer system resources, or engage in other abusive behavior.

Malware analysis system 108 may be operable to run one or more malware detection processes on files 116 and determine a status of the files 116. Running the one or more malware detection processes on a file 116 accessed by malware analysis system 108 may, in certain instances, result in a detection of malware. Malware detection by malware analysis system 108 may conclusively indicate that the file 116 or files 116 in question are known not to contain malware. Malware detection by malware analysis system 108 may conclusively indicate that the file 116 or files 116 in question are known to contain malware. Alternatively, malware detection by malware analysis system 108 may indicate that the file 116 or files 116 in question are suspected of malware, though such detection may not conclusively indicate that the file 116 or files 116 are known to contain malware. These and other example statuses are described in greater detail below.

In certain embodiments, a portion of malware analysis system 108 may generate information that is accessible by a human analyst (e.g., using analysis console 210, described in greater detail below with reference to FIGS. 2-3) for further malware analysis of one or more files 116 suspected of malware. The information may correspond to one or more files 116 subjected to a set of malware detection process run by malware analysis system 108.

In certain embodiments, malware analysis system 108 may generate a response 124 indicating a result of the malware analysis of the file 116 or files 116 performed by malware analysis system 108. In certain embodiments, response 124 may be communicated to client system 102 (via web services system 106) in response to a callback request submitted by client system 102 and/or in response to a status request submitted by client system 102.

In certain embodiments, malware analysis system 108 may publish available operations/interactions as a web service (e.g., via web services system 106). Thus, client system 102 and malware analysis system 108 may communicate with one another via the web service, using one or more messages formatted according to the web service interface provided by web services system 106. For example, client system 102 may communicate files 116 and/or other information to malware analysis system 108 via the web service, requesting that malware analysis system 108 analyze file 116 for malware or otherwise provide a result 126.

Malware analysis system 108 may include any suitable combination of hardware, firmware, and software. For example, malware analysis system 108 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones, one or more servers, a server pool, switch, router, disks or disk arrays, one or more processors within these or other devices, or any other suitable processing device. Malware analysis system 108 may be a stand-alone computer or may be a part of a larger network of computers associated with an entity.

Malware analysis system 108 may comprise a processing unit 132 and a memory unit 134. Processing unit 132 may include one or more microprocessors, controllers, or any other suitable computing devices or resources. Processing unit 132 may work, either alone or with other components of system 100, to provide a portion or all of the functionality of system 100 described herein. Memory unit 134 may take the form of volatile or non-volatile memory including, without limitation, magnetic media, optical media, RAM, ROM, removable media, or any other suitable memory component. In certain embodiments, a portion of all of memory unit 134 may include a database, such as one or more SQL servers or relational databases.

In certain embodiments, malware analysis system 108 may include a malware analysis module 136. Malware analysis module 136 may be implemented in any suitable combination of hardware, firmware, and software. Malware analysis module 136 may be a web service running on malware analysis system 108 and may implement the web service interface used by client system 102 and malware analysis system 108. For example, when communicating with one another using the web service interface, client system 102 and malware analysis system 108 may communicate messages (e.g., requests 122 and responses 124) via malware analysis module 136, which may enforce and interpret the message formats of the web service interface for communicating with malware analysis system 108.

Figure 2:
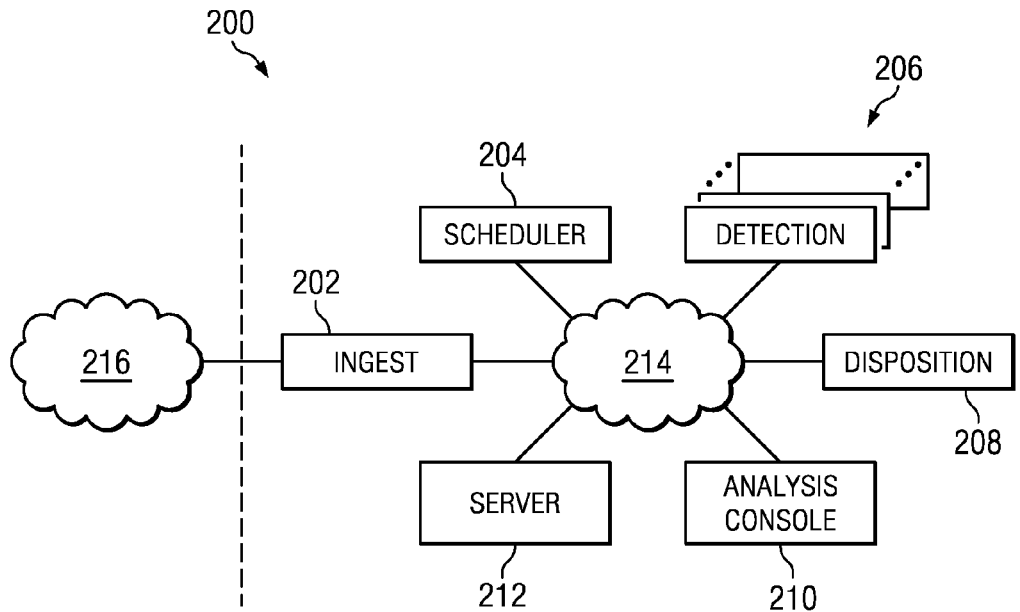
FIG. 2 illustrates an example malware analysis system, according to certain embodiments of the present disclosure.

A particular example implementation of malware analysis system 108 is illustrated in FIG. 2 and described below in greater detail. Although that particular example implementation of malware analysis system 108 is illustrated and described, the present disclosure contemplates implementing malware analysis system 108 in any suitable manner, according to particular needs. Although illustrated separately, web services system 106 and malware analysis system 108 may be combined or separated in any suitable manner, according to particular needs.

Web services system 106 and/or malware analysis system 108 may be coupled to or otherwise associated with a storage module 138. Storage module 138 may take the form of volatile or non-volatile memory including, without limitation, magnetic media, optical media, RAM, ROM, removable media, or any other suitable memory component. In certain embodiments, a portion of all of storage module 138 may include a database, such as one or more structured query language (SQL) servers or relational databases. Storage module 138 may be a part of or distinct from a memory unit 128 and/or memory unit 134 of web services module 106 and/or malware analysis system 108, respectively.

Storage module 138 may store a variety of information that may be used by web services module 106 and/or malware analysis system 108. In the illustrated example, storage module 138 stores files 116, file information 118, callback information 120, and historical detection data 140, each of which are described in greater detail below. Although storage module 138 is described as including particular information, storage module 138 may store any other suitable information. Furthermore, although particular information is described as being stored in storage module 138, the present description contemplates storing this particular information in any suitable location, according to particular needs.

Files 116 in storage module 138 may be copies of files 116 received from client systems 102 (e.g., as part of certain malware analysis requests 122) via web services system 106. File information 118 in storage module 138 may be any suitable information about files 116. For example, file information 118 in storage module 138 may include any suitable combination of a portion or all of file information 118 (possibly received from client system 102 as part of a request 122), information about file 116 generated by web services system 106 and/or malware analysis system 108, and any other suitable information about file 116. Callback information 120 in storage module 138 may include callback information 120 received from client system 102 as part of a request 122. Historical detection data 140 may include historical results of past and/or ongoing malware analyses of files 116 by malware analysis system 108. In certain embodiments, historical detection data 140 is indexed by hashes or other identifiers of files 116, and web services system 106 and/or malware analysis system 108 may use the hashes or other identifiers of files 116 to determine if a file 116 identified in a request 122 (e.g., a status request) has been analyzed previously for malware.

As described above, web services module 130 of web services system 106 may implement a web services interface, which may include mechanisms by which client system 102 and malware analysis system 108 may interact. This web services interface may implement message formats communicated between client system 102 and malware analysis system 108 (e.g., malware analysis requests 122 and responses 124), possibly via web services system 106. As described above, client system 102 (e.g., application 114) may communicate malware analysis requests 122 to web services system 106. In certain embodiments, example malware analysis requests 122 may include a status request, a file analysis request, a callback request, and other suitable types of requests. Each of these example types of requests are described below.

As a first example, web services module 130 may provide a synchronous mechanism for client system 102 to request a status of a malware detection analysis of a file 116. This synchronous mechanism may be implemented as a status request 122. Client system 102 may submit a status request 122 prior to sending file 116 to malware analysis system 108 for a malware analysis, after sending file 116 to malware analysis system 108 for a malware analysis to be performed on file 116, or at any other suitable time.

The status request 122 may identify one or more files 116 for which the status is requested. For example, the status request may identify a file to be validated by including for each file 116 any suitable combination of a file name, a file identifier (e.g., a hash value computed for the file 116), and any other suitable metadata. In certain embodiments, application 114 may compute the hash value using MD5, SHA-1, or any other suitable hash algorithm. The status request may include an identity of the caller (e.g., an identity of client system 102 and/or a user of client system 102 communicating the status request). The status request may include any other suitable information about the one or more files 116 and client system 102, along with any other suitable information.

In certain embodiments, the status request 122 prompts a substantially immediate response from web services system 106 regarding whether the one or more files 116 identified in the status request 122 have been previously analyzed (or are currently being analyzed) for malware by malware analysis system 108. In certain embodiments, to have a particular file 116 analyzed for malware by malware analysis system 108, a client system 102 first submits a status request 122 regarding the file 116. This may filter traffic (e.g., file analysis requests 122) that actually are delivered to malware analysis system 108 for a malware analysis to be performed by first determining whether malware analysis system 108 already has determined (or currently is determining) a malware status for the file 116.

As a second example, web services module 130 may provide an asynchronous mechanism for uploading single or multiple files for a malware analysis to be performed on those file(s) 116 by malware analysis system 108. Web service module 130 then optionally may call back to client system 102 upon completion of the malware analysis of the file with results of the malware analysis, such as a status of file 116 determined by malware analysis system 108. This asynchronous mechanism may be implemented as a file analysis request 122 with a possible callback request 122. For example, file analysis request 122 may provide an asynchronous mechanism for uploading single or multiple binary files 116 for a malware analysis of that file 116 or those files 116 to be performed by malware analysis system 108. If a callback request 122 has been submitted by client system 102, web services system 106 may call back to client system 102 substantially upon completion of the malware analysis of file 116 by malware analysis system 108 with a status of file 116.

In certain embodiments, web services module 130 is operable to provide for secure communication between client system 102 and malware analysis system 108, which may include authenticating a user of client system 102 and/or client system 102. For example, client system 102 may provide one or more of a user name, a password, and a nonce. The user name and password may be used to authenticate client system 102 to web services system 106. The nonce may be used by web service system 106 to authenticate back to client system 102 on completion of determination of a status of file 116 (e.g., to provide response 124 to client system 102). In certain embodiments, the nonce is random and not a sequence to prevent replay attacks. Web services system 106 also may use secure sockets layer (SSL) or any other suitable secure communication protocol for the transportation layer security, if appropriate. Certain embodiments may use one or more of digital signing of caller credentials and/or message body and Web Services Security.

Response 124 may include one or more status messages. In certain embodiments, a status message may be returned for each file 116 submitted to web service system 106 for a malware analysis to be performed by malware analysis system 108. The following provides just one example set of status messages that may be returned by malware analysis system 108. Although these particular examples are described, the present disclosure contemplates malware analysis system 108 returning any suitable status messages, according to particular needs.

GOOD—Known by malware analysis system 108 to be good.
BAD—Known by malware analysis system 108 to be bad.
UNKNOWN—Has not be encountered by malware analysis system 108.
SUSPICIOUS—Deemed suspicious by malware analysis system 108 based upon analysis results (e.g., based on results returned from agents, described in greater detail below with respect to FIGS. 2-3.
GOOD BY POLICY—Marked by malware analysis system 108 as GOOD based upon a combination of agent results defined by a policy.
BAD BY POLICY—Marked by malware analysis system 108 as BAD based upon a combination of agent results defined by a policy.
SUSPICIOUS BY POLICY—Marked by malware analysis system 108 as SUSPICIOUS based upon a combination of agent results defined by a policy.
PROCESSING_FAILURE—Malware analysis system 108 encountered a processing failure that is generally going to be unretryable.
NOT_SUPPORTED—The caller (e.g., application 114 of client system 102) provided a type of file 116 that malware analysis system 108 and/or web services system 106 is currently not configured to support.

In certain embodiments, client system 102 may pre-filter which files 116 are communicated to malware analysis system 108 for analysis. For example, client system 102 may store policies that limit which types of files 116 are communicated to malware analysis system 108 for analysis. In certain embodiments, the types of files 116 that may be communicated to malware analysis system 108 for analysis may be limited by what types of files malware analysis system 108 is configured to analyze. In certain embodiments, client system 102 may simply pass files 116 according to its own policies, and web services module 106/malware analysis system 108 may inform client system 102 if malware analysis system 108 is unwilling/incapable of analyzing a particular type of file. For example, client system 102 may determine a file extension of file 116 and/or a magic MIME type of file 116 and communicate these parameters as part of a call to malware analysis system 108 (which could then apply its own internal ingest policies to determine if it is willing to/capable of processing the file 116).

The following provides an example implementation of the web services operations that may be used in certain embodiments of the present disclosure. The various requests/calls, outputs, and associated parameters are provided for example purposes only. Additionally, the names provided for these requests/calls, outputs, and associate parameters are for example purposes only. Furthermore, particular parameters may be designated as required (e.g., by the web services protocol), while others may be designated as optional; however, any such indications below are merely examples. In certain embodiments, some or all of these operations are implemented by web services module 130.

CheckFile Operation

In certain embodiments, the status request 122 and associated output (e.g., response 124) may be implemented using a "CheckFile" web services call. CheckFile may receive a list of file names, hashes, and file meta data and may check the list against storage module 138 (e.g., historical detection data 140). If the file 116 has been encountered before, malware status for the file 116 and the results from each malware detection agent (examples of which are described below with respect to detection module 206 in FIG. 2) including reason codes may be returned. If the file 116 has not be encountered, a status of UNKNOWN may be returned. Client systems 102 may pass files 116 with a status of UNKNOWN on using the AnalyzeBinaryFile operation, described below. The Checkfile web services call may be published as a SOAP action at a network address (e.g., a URL), such as http://www.website.com/malwaredetectionsystem/CheckFile, which is merely provided as an example.

Input: CheckFileSyncRequest

An input of the CheckFile request 122 may be a CheckFileSyncRequest request 122. An input type may be checkFileStatusInput. Example parameters for this input type may be the following:

callerId—This parameter may identify the client system 102 that is the source of the request 122. In certain embodiments, a scheduler associated with malware analysis system 108 may use this parameter for prioritization of requests 122.
userId—This parameter may be used to authenticate client system 102 to web services system 104 and/or malware analysis system 108.
password—This parameter, possibly in combination with the userId, may be used to authenticate client system 102 to web services system 104 and/or malware analysis system 108.
transactionId—This parameter may be a unique ID (e.g., provided by the caller (e.g., client system 102)) for identification purposes. In certain embodiments, if transactionId is not specified, the messageId from the address header may be used as an identifier for the transaction.

File information may be passed as part of a CheckFile request 122. A fileInfo request 122 may be unbounded and of type fileInfo and may include any suitable combination of the following parameters:

fileName—This parameter may provide the name of the file 116 being analyzed.
md5Hash—This parameter may provide an md5 hash of the file 116.

sha1Hash—This parameter may provide a sha1 hash of the file 116.

mimeTypes—This parameter may be unbounded and provide magic mime types of the file 116.

extension—This parameter may provide the file extension of the file 116.

fileMetaData—This parameter may be of type fileMetaData and may be 0 to many. The fileMetaData parameter may include a name value pairing with nested elements metaDataName and metaDataValue. In certain embodiments, the fileMetaData field may be used to pass additional data to web services system 106. In certain embodiments, this additional data may not be used in the analyzing the file(s) 116 for malware but may aid a human analyst and/or other portions of malware analysis system 108 in either detection or remediation of an event. However, the present disclosure contemplates system 100 making any suitable use of this additional data.

Output: CheckFileSyncResponse

An output of the CheckFile web services call may be the CheckFileSyncResponse response 124. An output type may be fileStatusOutput. Example parameters for this output type may be the following:

transactionId—This parameter may provide the original transactionId that was sent in by the initial calling client system 102. In certain embodiments, the transactionId may be the same as the messageId in the address header (e.g., if a transactionId was not initially set in the input).

fileStatusInfo—This parameter may be unbounded and may be of type fileStatusInfo and may include any suitable combination of the following parameters:

filename—This parameter may be of type String and may provide the file name of file 116. In certain embodiments, this parameter may be present but blank.

extMimeType—This parameter of be of type String and may provide the file MIME type(s) based upon extension of file 116.

magicMimeType—This parameter may be of type String and may provide the MIME type(s) of file 116 based upon a magic number analysis.

md5Hash—This parameter may be of type String and may provide an md5 hash of file 116.

sha1Hash—This parameter may be of type String and may provide a sha1 hash of file 116.

status—This parameter may be of type String and may provide the file status (e.g., one or more of the file statuses described above) of file 116.

parentSource—This parameter may be of type String and may indicate the source file of the analyzed file. For example, the source file may be another file (e.g., a ZIP or other archived file) in which the analyzed file 116 is embedded.

parentClusterType—This parameter may be of type String and may indicate whether the file 116 came from a ZIP file (or other archived file) or was a standalone file.

agentResultList—This parameter may provide a list of agent results provided by different malware detection agents of malware analysis system 108, if applicable.

agentResult—This parameter may be unbounded and may include any suitable combination of the following:

agentType—This parameter may be of type String and may identify a particular malware detection agent of malware analysis system 108 that is used to analyze file 116.

agentBaseline—This parameter may be of type String and may identify a version of a particular malware detection agent of malware analysis system 108 that is used to analyze a file. The value of agentBaseline may be a number, but the present disclosure contemplates any suitable format.

agentCategory—This parameter may be of type String and may identify a category of a particular malware detection agent of malware analysis system 108 that is used to analyze file 116. Example categories may include behavioral, heuristic, signature, file context, metadata, and any other suitable type of malware detection agent category.

result—This parameter may be of type String and may provide a text or other representation of a result code (e.g., a status) for a malware analysis performed by a malware detection agent of malware analysis system 108. Particular example codes may include Good, Bad, and Suspicious. Additional examples are described above.

reason—This parameter may be of type String and may include an indication of a reason for a result. In certain embodiments, malware detection agents returning a status of bad or suspicious provide a value for this parameter.

Fault

In certain embodiments, web services system 106 may determine when a fault, such as a processing fault, has occurred. In certain embodiments, web service system 106 may use the JAVA Application Program Interface (API) for XML Web Services (JAX-WS) fault mapping to communicate the error to the caller (e.g., client system 102). This may be represented by a Fault message of type Fault, which may include one or more of the following parameters:

code—This parameter may be of type String and may include an error code for the error.

message—This parameter may be of type String and may include an error message for the error.

AnalyzeBinaryFile Operation

In certain embodiments, the malware analysis request 122 and associated output (e.g., response 124) may be implemented using a "AnalyzeBinaryFile" web services call. The AnalyzeBinaryFile operation may be used for asynchronous calls to web services system 106/malware analysis system 108. The client (e.g., client system 102) may send callback information (e.g., a callback URL and message id), stored in a WS-Addressing header, for web services system 106/malware analysis system 108 to respond to once a status has been completed for file 116.

A replyTo field within the WS-Addressing header may be used to store the callback URL, and the messageId field may be used to store a unique ID identifying the request to the client system 102 upon callback. Web services system 106 and/or malware analysis system 108 may use this unique ID in the relatesTo field when calling back to the client (e.g., client system 102).

Due to the length of time that may transpire for malware analysis system 108 to reach a disposition of file 116, it may be appropriate for the receiver (e.g., application 114) at the requesting client system 102 to be persistent. In certain embodiments, the receiver may be implemented as another web service. The WS-Addressing may be optional for services that do not request a callback. Files 116 received without addressing may be processed by web services system 106 and/or malware analysis system 108, and the status may be available through the CheckFile web service call.

The AnalyzeBinaryFile web services call may be published as a SOAP action at a network address (e.g., a URL), such as http://www.website.com/malwaredetectionsystem/AnalayzeBinaryFile, which is merely provided as an example. The operation type of the AnalyzeBinaryFile may be request-response such that the endpoint may receive a message and send a correlated message.

Input: AnalyzeBinaryAsyncRequest

An input of the AnalyzeBinaryFile request 122 may be an AnalyzeFileAsync request 122. An input type may be analyzeBinaryFileInput. Example parameters for this input type may be the following:

callerId—This parameter may identify the client system 102 that is the source of the request 122. In certain embodiments, a scheduler associated with malware analysis system 108 may use this parameter for prioritization of requests 122.

userId—This parameter may be used to authenticate client system 102 to web services system 104 and/or malware analysis system 108.

password—This parameter, possibly in combination with the userId, may be used to authenticate client system 102 to web services system 104 and/or malware analysis system 108.

transactionId—This parameter may be a unique ID (e.g., provided by the caller (e.g., client system 102)) for identification purposes. In certain embodiments, if transactionId is not specified, the messageId from the address header may be used as an identifier for the transaction.

One or more of these parameters may be provided by an administrator associated with malware analysis system 108 to services approved for calling web services system 106/malware analysis system 108 in this manner.

A copy of file 116 and/or any other suitable information (e.g., file information 118) may be passed as part of a AnalyzeBinaryFile request 122. A fileBinary request 122 may be unbounded and of type fileBinary. A fileBinary request 122 may include a fileInfo component that may be unbounded and of type fileInfo. The fileInfo component may include any suitable combination of the following parameters:

fileName—This parameter may provide the name of the file 116 being analyzed.

md5Hash—This parameter may provide an md5 hash of file 116.

sha1Hash—This parameter may provide a sha1 hash of file 116.

mimeTypes—This parameter may be unbounded and provide magic MIME types of file 116.

extension—This parameter may provide the file extension of file 116.

fileMetaData—This parameter may be of type fileMetaData and may be 0 to many. The fileMetaData parameter may include a name value pairing with nested elements metaDataName and metaDataValue. In certain embodiments, the fileMetaData field may be used to pass additional data to web services system 106. In certain embodiments, this additional data may not be used in the analyzing the file(s) 116 for malware but may aid a human analyst and/or other portions of malware analysis system 108 in either detection or remediation of an event. However, the present disclosure contemplates system 100 making any suitable use of this additional data.

binaryData—This parameter may include an encoded copy of the file 116 to be analyzed by malware analysis system 108. In certain embodiments, this parameter is a base 64 encoded copy of file 116, which may be streamed from client system 102 to web services module 106/malware analysis system 108 using a suitable technique such as Message Transmission Optimization Mechanism (MTOM). Although a particular encoding technique is provided, the present disclosure contemplates using any suitable encoding mechanism.

Output: AnalyzeFileAsyncResponse

An output of the AnalyzeBinaryFile web services call may be the AnalyzeFileAsyncResponse response 124. An output type may be response. Example parameters for this output type may be the following:

response—This parameter may be of type String. In certain embodiments, the string "Success" (or another suitable indicator) may be returned on a successful completion of the analysis of file 116. Additionally or alternatively, this field may include any other suitable information.

Fault

In certain embodiments, web services system 106 may determine when a fault, such as a processing fault, has occurred. In certain embodiments, web service system 106 may use the JAX-WS fault mapping to communicate the error to the caller (e.g., client system 102). This may be represented by a Fault message of type Fault, which may include one or more of the following parameters:

code—This parameter may be of type String and may include an error code for the error.

message—This parameter may be of type String and may include an error message for the error.

Callback Operation

In certain embodiments, a subsequent response 124 from web services module 106/malware analysis system 108 to an AnalyzeBinaryFile web service call from client system 102 may be a callback operation. In certain situations, this may not be a substantially immediate response to the AnalyzeBinaryFile web services call, but may be communicated at a later time after malware analysis system 108 has completed its analysis of the file 116 communicated in association with the AnalyzeBinaryFile request 122. Web services system 106/malware analysis system 108 may call a persistent listener (e.g., application 114) on client system 102 and pass the results of the malware analysis performed by malware analysis system 108 (e.g., a status of file 116). The listener on client system 102 may be implemented as a web service and may be configured to receive a callback message from web services system 106/malware analysis system 108. An example format for the callback message is provided below.

In certain embodiments, the callback message is listed as "CallBackRequest" in the WSDL. The listener being implemented on client system 102 may use WS-Addressing. Web services system 106/malware analysis system 108 may either use WS-Addressing headers to identify the original request sent by client system 102 or the transactionID (e.g., provided by the caller (e.g., client system 102)). The header may include a "RelatedTo" tag, which may include the original MessageId sent in the WS-Addressing by client system 102 during the "AnalyzeBinaryFile" request in addition to the transactionID in the message body. Some or all of this information may be included as part of the callback information provided by client system 102. Details of an example callback operation are provided below.

Input: CallBackRequest

An input of the CallBackRequest request 122 may be a fileStatusCallBack request 122. An input type may be fileStatusCallBack. Example parameters for this input type may be the following:

transactionId—This parameter may provide the original transactionid that was sent by client system 102. In certain embodiments, the transactionID may be the same as the messageId in the address header (e.g., if a transactionId was not initially set in the input).

fileStatusInfo—This parameter may be unbounded, may be of type fileStatusInfo, and may include any suitable combination of the following parameters:

filename—This parameter may be of type String and may provide the file name of file 116. In certain embodiments, this parameter may be present but blank.

extMimeType—This parameter may be of type String and may provide the file MIME type(s) based upon extension of file 116.

magicMimeType—This parameter may be of type String and may provide the MIME type(s) of file 116 based upon a magic number analysis.

md5Hash—This parameter may be of type String and may provide an md5 hash of file 116.

sha1Hash—This parameter may be of type String and may provide a sha1 hash of the file.

status—This parameter may be of type String and may provide the file status (e.g., one or more of the file statuses described above) of file 116.

parentSource—This parameter may be of type String and may indicate the source file of the analyzed file. For example, the source file may be another file (e.g., a ZIP or other archived file) in which the analyzed file 116 is embedded.

parentClusterType—This parameter may be of type String and may indicate whether the file 116 came from a ZIP file (or other archived file) or was a standalone file.

agentResultList—This parameter may provide a list of agent results provided by different malware detection agents of malware analyses system 108, if applicable.

agentResult This parameter may be unbounded and may include any suitable combination of the following:

agentType—This parameter may be of type String and may identify a particular malware detection agent of malware analysis system 108 that is used to analyze file 116.

agentBaseline—This parameter may be of type String and may identify a version of a particular malware detection agent of malware analysis system 108 that is used to analyze file 116. The value of agentBaseline may be a number, but the present disclosure contemplates any suitable format.

agentCategory—This parameter may be of type String and may identify a category of a particular malware detection agent of malware analysis system 108 that is used to analyze file 116. Example categories may include behavioral, heuristic, signature, file context, metadata, and any other suitable type of malware detection agent category.

result—This parameter may be of type String and may provide a text or other representation of a result code (e.g., a status) for a malware analysis performed by a malware detection agent of malware analysis system 108. Particular example codes may include Good, Bad, and Suspicious. Additional examples are described above.

reason—This parameter may be of type String and may include an indication of a reason for a result. In certain embodiments, malware detection agents returning a status of bad or suspicious provide a value for this parameter.

supportFileInfo—This parameter may be unbounded and may include the file name and file type of any support files pertaining to the original file 116 sent for analysis. In certain embodiments, this information generally may be empty for web service calls.

supportFileName—This parameter may be of type String and may include the file name of the support file.

supportFileType—This parameter may be of type String and may include a description of the file type of the support file.

agentSupportFileInfo—This parameter may be unbounded and may include information about a support file of a particular malware detection agent of malware analysis system 108 that is used to analyze a file. Support files may be generated by some malware detection agent of malware analysis system 108 as further evidentiary documentation of the behavior of a file 116 being analyzed. For example, an agent support file of a malware detection agent of malware analysis system 108 may consist of an action log detailing the steps the malware (of the file 116) took as it was executed by one of the behavior malware detection agent.

agentSupportFileID—This parameter may be of type String and may include a unique ID of the support file.

agentSupportFileAgentBaseline—type String—This parameter may be a base line of the malware detection agent that generated this support file.

agentSupportFileAgentCategory—This parameter may be of type String and may include an associated agent category of the malware detection agent of malware analysis system 108. Example categories of malware detection agents of malware analysis system 108 may include behavioral, heuristic, signature, file context, and metadata.

agentSupportFileArchivedFileID—This parameter may be of type String and may include a unique file ID for original file 116 sent for analysis.

agentSupportFileName—This parameter may be of type String and may include a file name of the support file.

Particular embodiments of the present disclosure may provide one or more technical advantages. Certain embodiments allow computer systems (e.g., client systems 102) to access malware analysis services provided by malware analysis system 108 by invoking those malware detection services using a web services interface. Embodiments of the present disclosure may provide a network-accessible interface, which may be a universal interface, to malware analysis system 108 and its associated data repository (e.g., storage module 138) of historical malware analyses (e.g., historical detection data 140). Providing a web services interface for communicating with malware analysis system 108 may ease the use of such a system, thereby potentially encouraging its use. Communication of files 116 to a remote malware analysis system 108 for analysis may allow for more robust malware analysis to be performed than might be possible or practical with typical host-based or other local malware analysis systems. In certain embodiments, the remote malware analysis system 108 further provides a mechanism for a human analyst to contribute to the malware analysis of certain files 116, if appropriate.

FIG. 2 illustrates an example malware analysis system 200, according to certain embodiments of the present disclosure. Malware analysis system 200 provides just one example of how malware analysis system 108 (or a portion of malware analysis system 108) may be implemented. Although this particular example implementation of malware analysis system 108 is illustrated and described, the present disclosure contemplates implementing malware analysis system 108 in any suitable manner, according to particular needs. In the illustrated example, malware analysis system 200 includes ingest module 202, scheduler module 204, detection module 206, disposition module 208, analysis console 210, and server module 212.

Modules 202-212 may communicate between or among each other via one or more internal networks 214, referred to for simplicity in the singular. Internal network 214 facilitates wireless or wireline communication. Internal network 214 may communicate, for example, IP packets, Frame Relay frames, ATM cells, voice, video, data, and other suitable information between network addresses. Internal network 214 may include one or more LANs, RANs, MANs, WANs, mobile networks (e.g., using WiMax (802.16), WiFi (802.11), 3G, 4G, or any other suitable wireless technologies in any suitable combination), all or a portion of the global computer network known as the Internet, and/or any other communication system or systems at one or more locations, any of which may be any suitable combination of wireless and wireline. In certain embodiments, internal network 214 includes a system bus. Malware analysis system 200 may communicate with an external network 216, which in certain embodiments may be substantially similar to network 108 of FIG. 1.

Modules 202-212 may be implemented using any suitable combination of hardware, firmware, and software. For example, modules 202-212 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones, one or more servers, a server pool, one or more processors within these or other devices, or any other suitable processing device. Modules 202-212 may be a stand-alone computer or may be a part of a larger network of computers associated with an entity.

Modules 202-212 may include one or more processing units and one or more memory units. Each processing unit may include one or more microprocessors, controllers, or any other suitable computing devices or resources. Each processing unit may work, either alone or with other components of system 200, to provide a portion or all of the functionality of its associated computer system described herein. Each memory unit may take the form of a suitable combination of volatile and non-volatile memory including, without limitation, magnetic media, optical media, RAM, ROM, removable media, or any other suitable memory component.

In certain embodiments, the implementation and/or operation of modules 202-212 is implemented generally as follows. Ingest module 202 may access a file 116 and determine one or more tests that should be performed on file 116 to determine whether file 116 is suspected of malware. In response, detection module 206 may perform the test(s) that were determined by ingest module 202 in accordance with scheduling performed by scheduler module 204. Disposition module 208 uses the results of the tests performed by detection module 206 to determine whether the file 116 should be sent to server module 212 for quarantine purposes while a second analytical stage for file 116 is processed (e.g., at analysis console 210). Further details regarding the implementation and/or operation of modules 202-212 are described below.

Ingest module 202 may be operable to extract and cause to be analyzed file 116 accessed by malware analysis system 200. Ingest module 202 may analyze file 116 and determine one or more tests that should be performed on file 116 to determine whether file 116 is suspected of malware. In certain embodiments, ingest module 202 may be configured to determine a type of a file ingest module 202 receives. For example, ingest module 202 may examine an extension associated with the file name of file 116 to determine the type of the file. As another example, ingest module 202 may examine portions of the file content of file 116 to determine its type. Ingest module 202 may examine characters in a header of file 116 to determine its type. Such characters may be referred to as magic numbers or magic bits. In this manner, in certain embodiments, ingest module 202 may detect the correct type of file 116 even if the extension of the filename of file 116 has been removed or changed (e.g., falsified). As another example, for certain types of files 116 (e.g., MICROSOFT OFFICE files), ingest module 202 may determine the file type based on both magic number(s) and the file extension, possibly examining the magic number(s) prior to examining the file extension.

In certain embodiments, ingest module 202 may determine whether file 116 has been previously analyzed for malware. Ingest module 202 may use one or more techniques to determine if file 116 has been previously analyzed for malware. For example, ingest module 202 may generate one or more hashes of content of file 116 (such as a checksum, an MD5 hash, and/or a SHA1 hash). These value(s) may be compared to a database containing hash values of previously analyzed files 116. If the hash value is found in data storage, ingest module 202 may determine that file 116 has been previously analyzed. If the hash value is not present in data storage, ingest module 202 may determine that file 116 has not been previously analyzed. In certain embodiments, ingest module 202 may use the name of file 116 and/or its extension, as well as variations on those items, to determine if file 116 has been previously analyzed.

In certain embodiments, if it is determined that file 116 has been analyzed previously, malware detection schemes may not be applied to file 116; instead, the results of the previous analysis of file 116 may be determined using a database that contains results of a previous analysis of file 116. If the results indicate that file 116 is known not to be malware, then the analysis of file 116 may end. If it is determined that file 116 was previously determined to be malware, then it may be determined that file 116 should be quarantined. If it is determined that file 116 has been previously received and is currently being analyzed (e.g., possibly including review by human analysts associated with analysis console 210), then action may be taken once the outcome of the ongoing analysis is known. In certain embodiments, this ability to check whether a file 116 previously has been analyzed previously may allow for more efficient use of the resources that perform the malware detection schemes on the files 116 and may reduce the workload of a machine and/or human analyst.

While in this example, ingest module 202 is described as generating the information (e.g., the one or more hashes) used to determine whether file 116 has been previously analyzed, in certain embodiments, the sender of file 116 (e.g., client system 102 and/or processing system 104) may generate this information and communicate this information to malware analysis system 108 (e.g., to ingest module 202). For example, prior to or in addition to sending the actual file 116 to malware analysis detection system 108, the sender of file 116 may send this information to malware analysis system 108 so that malware analysis system 108 can determine whether file 116 previously has been analyzed for malware. If malware analysis system 108 determines that file 116 has not been analyzed previously for malware, then (if file 116 was not sent previously) malware analysis system 108 may request that the sender send the actual file 116 for analysis.

In certain embodiments, ingest module 202 may be used to determine whether file 116 should undergo malware detection and/or which malware detection schemes should be applied. For example, ingest module 202 may determine that a file 116 received by ingest module 210 is a plain text file. Ingest module 202 then may retrieve one or more policies associated with plain text files. A retrieved policy may indicate that plain text files are not to be analyzed for malware. As a result, the plain text file 116 may be ignored. As another example, ingest module 202 may determine that a file 116 is a document created by the MICROSOFT WORD application. Ingest module 202 may then retrieve one or more policies associated with MICROSOFT WORD documents. Ingest module 202 may examine the retrieved policy or policies and determine that the received file 116 should be analyzed for malware. Ingest module 202 may also examine the retrieved policy or policies and determine the malware detection schemes that should be applied to the MICROSOFT WORD document. Ingest module 202 then may create and store entries in data storage consistent with the determined malware detection schemes.

Scheduler module 204, in certain embodiments, may determine the order in which malware detection processes are performed. Scheduler module 204 may assign processes to various computing resources of malware analysis system 200 using any suitable method. For example, scheduler module 204 may use a first-in-first-out (FIFO) algorithm to assign processes. Processes may also be prioritized. For example, scheduler module 204 may use a FIFO approach to schedule jobs initially, but it may be determined to prioritize one job over another in response to results provided by the detection nodes. Schedule policies may be used by scheduler module 204 to determine how to schedule jobs and how to prioritize jobs. Priorities for jobs, in certain embodiments, may also be determined based on the context associated with the file 116. For example, if the file 116 undergoing analysis was part of an e-mail attachment, it may be prioritized higher than other files 116.

In certain embodiments, policies used by scheduler module 204 may be modified when a new malware detection scheme is added. Information may be entered regarding how to apply the malware detection scheme. For example, such information may be entered using a tabbed interface, a wizard-style interface, or other interfaces for entering information. The information entered may include how jobs should be prioritized, the context associated with file 116, which malware detection nodes 102 are involved in implementing the malware detection scheme, and/or other items associated with applying a malware detection scheme.

Detection module 206, in certain embodiments, may be operable to perform the test(s) that were determined by ingest module 202 in accordance with scheduling performed by scheduler module 204. In certain embodiments, detection module 206 may conform to an interface standard for applying malware detection. Such an interface may include standards for one or more of the following: specifying file 116 (including, possibly, a URL) that is to be analyzed configuration parameters for applying the detection scheme, time limit for completing the analysis, format of results, specifying the reason for indicating that an analyzed item is suspect, providing log files, and other suitable items involved with applying malware detection schemes.

In certain embodiments, having such an interface may be advantageous because it may allow policies to call for the application of malware detection schemes without having to give precise parameters based on the configuration of the detection node. In this manner, in certain embodiments, new detection schemes may be added to the system without needing to recode various parts of the system since the detection node applying the new malware detection scheme would conform to the interface standard. For example, to add a new malware detection scheme, the detection node applying the new malware detection seem may be configured to conform to the interface standard by being configured to receive files 116 for analysis in the same or similar manner as other configuration nodes applying other malware detection schemes. In addition, for example, the configuration node applying the new malware detection scheme may be configured to report the results of applying the new malware detection scheme in the same or similar manner as other configuration nodes applying other malware detection schemes. This may allow malware analysis system 200 to adapt to new malware detection schemes.

Detection module 206 may be implemented on a variety of types of hardware. For example, detection module 206 may be configured in a blade architecture or on physical hosts. Detection module 206 may be configured utilizing clusters or other suitable distributed computing architectures. Detection module 206 may use virtualization and/or may include virtual machines. Detection module 206 may be used to apply a variety of malware detection schemes to a file 116 (which, in certain embodiments, may include one or more URLs). In certain embodiments, detection module 206 may be specialized such that malware analysis system 200 may be configured to apply a type of malware detection scheme. For example, detection module 206 may be configured to apply behavior-based malware detection schemes and/or metadata-based detection schemes when metadata of file 116 is analyzed. In yet another example, detection module 206 may be configured to apply signature-based detection schemes to files 116. As another example, detection module 206 may also apply classification-based detection schemes. As described above, detection module 206 may be configured to apply other forms of detection schemes that conform to an interface to facilitate the incorporation of new or different detection schemes.

Disposition module 208, in certain embodiments, may be operable to use the results of the tests performed by detection module 206 to determine what should be done with the file(s) 116. In certain embodiments, disposition module 208 may access the one or more results received from detection module 206 (which may include a number of malware detection agents) and determine a status of file 116 based on those results. In some cases, disposition module 208 may characterize the file 116 as being suspected of malware. In response, malware analysis system 200 may send information corresponding to the file(s) 116 and/or actual content of the file(s) 116 (e.g., the file 116 itself) for further review at analysis console 210. In certain embodiments, disposition module 208 may respond to the results of detection module 206 regardless of whether it sends the file(s) 116 to analysis console 210. For example, disposition module 208 may determine that the file(s) 116 should be quarantined and send the file 116 to server module 212 to quarantine the file 116. In certain embodiments, disposition module 208 may determine that the file(s) 116 are not malware and may perform suitable corresponding actions. For example, disposition module 208 may indicate that it would be appropriate to release for delivery a message to which the analyzed file(s) 116 were attached, in response to the determination by disposition module 208 that the file(s) 116 are not malware.

Analysis console 210, in certain embodiments, is operable to facilitate malware analysis for files 116 that have been identified (e.g., by disposition module 208 or another suitable component of malware analysis system 200) as requiring further malware analysis. In certain embodiments, analysis console 210 may be operable to access information generated by disposition module 208 or another suitable component of malware analysis system 200, and to facilitate the propagation of a final disposition, if appropriate. The information propagated (e.g., for communication to another suitable component of malware analysis system 200 and/or to client system 102) may include malware analysis outputs generated by analysis console 210, such that the recipient may benefit from the results of malware analysis performed using analysis console 210. In certain embodiments, the output of analysis console 210 is a status of file 116, which in certain embodiments may override any status determined by disposition module 208. Additional details of an example analysis console 210 are described below with respect to FIG. 3.

Server module 212 may include, for example, a file server, a domain name server, a proxy server, a web server, a computer workstation, or any other tangible device and associated logic operable to communicate with modules 230, 240, 250, 260, and/or 280 through network 220. Server module 212 may execute with any of the well-known MS-DOS, PC-DOS, OS-2, MAC-OS, WINDOWS™, UNIX, or other appropriate operating systems, including future operating systems. In certain embodiments, server module 212 may include one or more of the following in any suitable combination: a processor, data storage, a network interface, input functionality, and output functionality.

Figure 3:
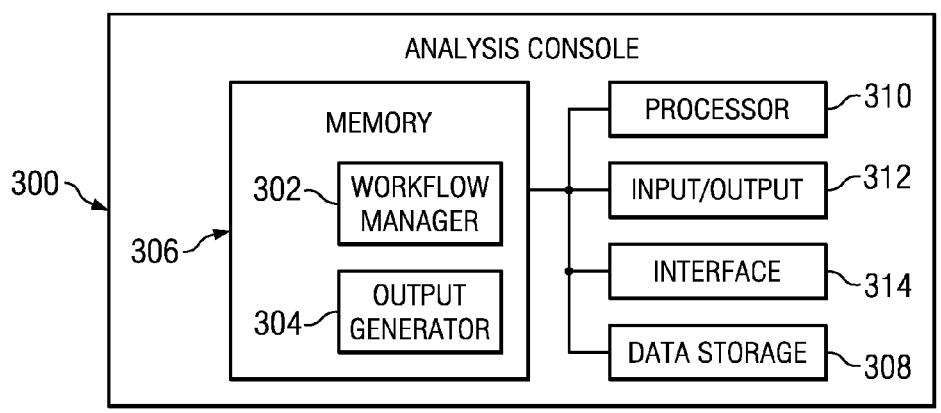
FIG. 3 illustrates one embodiment of an analysis console, according to certain embodiments of the present disclosure.

FIG. 3 illustrates one embodiment of an analysis console 300, according to certain embodiments of the present disclosure. In certain embodiments, analysis console 300 provides one example implementation of analysis console 210 of FIG. 2. As shown in FIG. 3, analysis console 300 includes a workflow manager 302 and an output generator 304 stored in computer-readable memory 306, data storage 308, processor 310, input/output functionality 312, and an interface 314. Workflow manager 302, output generator 304, memory 306, data storage 308, processor 310, input/output functionality 312, and interface 314 may be implemented using any suitable respective combination of hardware, firmware, or software. In certain embodiments, workflow manager 302, output generator 304, memory 306, data storage 308, processor 310, input/output functionality 312, and/or interface 314 may be capable of executing logic accessible to these components and/or stored therein. Although this embodiment includes workflow manager 302, output generator 304, memory 306, data storage 308, processor 310, input/output functionality 312, and interface 314, other embodiments may exclude one or more of these components without departing from the scope of the present disclosure.

In certain embodiments, workflow manager 302 may determine a workflow. A workflow is an ordered list of one or more tasks related to malware analysis. Execution of a workflow starts with a task in the list. Upon completion of a task, the active task calls the subsequent task in the ordered list using, for example, a defined API. When the final task of the workflow finishes, the workflow is complete. Certain workflows may facilitate malware analysis by a human analyst and/or by various analysis modules of analysis console 300. The information analyzed may correspond to a file 116 and/or may include actual content of the file 116.

In certain instances, the information to be analyzed may be presented to a human analyst for review based on a prior characterization of the file 116. For example, if malware analysis system 200 characterizes the file 116 as being suspected of malware, then a human analyst may review the file 116 to determine if it is in fact malware. As another example, if the file 116 is determined to be malware rather than merely to be suspected malware, a human analyst may review the file 116 to learn more about the malware in the file 116 and/or to start an incident response review (e.g., to clean up the file 116).

In such and other scenarios, workflow manager 302 may determine a workflow associated with reviewing the file 116. In certain embodiments, workflow manager 302 may generate a set of tasks to be performed by a human analyst reviewing the file 116 based on a variety of factors. Such factors could include the type of file 116 being reviewed and the characterization of the file 116 by malware analysis system 200. Other factors may include whether the system is operating in a passive, active, a hybrid passive/active mode, or another mode. For example, if operating in an active mode, a determination that the file 116 is suspected malware may invoke an advanced malware analysis workflow to be followed by a human analyst. As another example, if the file 116 is determined to be known malware, then workflows associated with cleaning up the environment(s) the file 116 has been in as well as other incident response workflows (e.g., notifying a user or an administrator) may be determined. Other suitable workflows may be generated based on these or other suitable factors.

In certain embodiments, workflow manager 302 may, automatically perform certain tasks to facilitate the review of the file 116 by the human analyst. For example, it may be determined that for a file 116 to be properly reviewed by a human analyst, all strings in the file 116 should be extracted. Workflow manager 302 may automate this extraction procedure. Workflow manager 302 may also provide a priority associated with the review of the file 116. For example, if it is determined that a file 116 has a higher probability of containing malware, then a higher priority may be assigned to the review of the file 116. Workflow manager 302 may also provide a display that enables the human analyst to review the workflow, the file 116 being analyzed, and/or information pertaining to that file 116.

Output generator 304, in certain embodiments, may be operable to generate a malware analysis output (a portion or all of which may be or may be included with response 124). In certain embodiments, the output may include an identifier of the file 116 or files 116 analyzed. For example, an identifier might include a hash of all or a portion of a file 116 analyzed at analysis console 300. The hash may be at least substantially equivalent to a hash generated by the ingest module 202 of the node 200 requesting the file 116 to be further analyzed for malware. Certain outputs generated by output generator 304 may include an indication of whether the file 116 (or files 116) analyzed at output generator 304 contain malware.

Memory 306 and data storage 308 may take the form of a suitable combination of volatile and non-volatile memory including, without limitation, magnetic media, optical media, RAM, ROM, removable media, or any other suitable memory component. Additionally, all or part of memory 306 and/or data storage 308 could reside locally within analysis console 300 or could reside at a location external but accessible to analysis console 300. Additionally, portions or all of memory 306 and data storage 308 may be combined, if appropriate.

Processor 310 may include one or more microprocessors, controllers, or any other suitable computing devices or resources. Each processor may work, either alone or with other components of analysis console 300, to provide a portion or all of the functionality of its associated computer system described herein. In certain embodiments, processor 310 may comprise the primary element or elements executing or realizing various logic-based functions, including, for example, the functions of workflow manager 302 and an output generator 304.

I/O functionality 312 may comprise, for example, any communication method of analysis console 300 (e.g., from an image buffer to a display). In certain embodiments, input functionality may comprise, for example, the receiving signals or data by analysis console 300. In other embodiments, output functionality may comprise, for example, the communication of signals or data by analysis console. These terms may also refer to part of an action, such as, for example, to "perform I/O" may involve performing an input and/or output operation. In some cases, one or more communication devices of analysis console 300 may be used to implement both input and output functionality.

Interface 314 may comprise, for example, any tangible device(s) that may be used (e.g., by a person, or by another device or system) to communicate with analysis console 300. For example, keyboards and mice may be considered input interfaces 314 of some analysis consoles 300, while monitors and printers may be considered output interfaces of some analysis consoles 300.

Figure 4A:
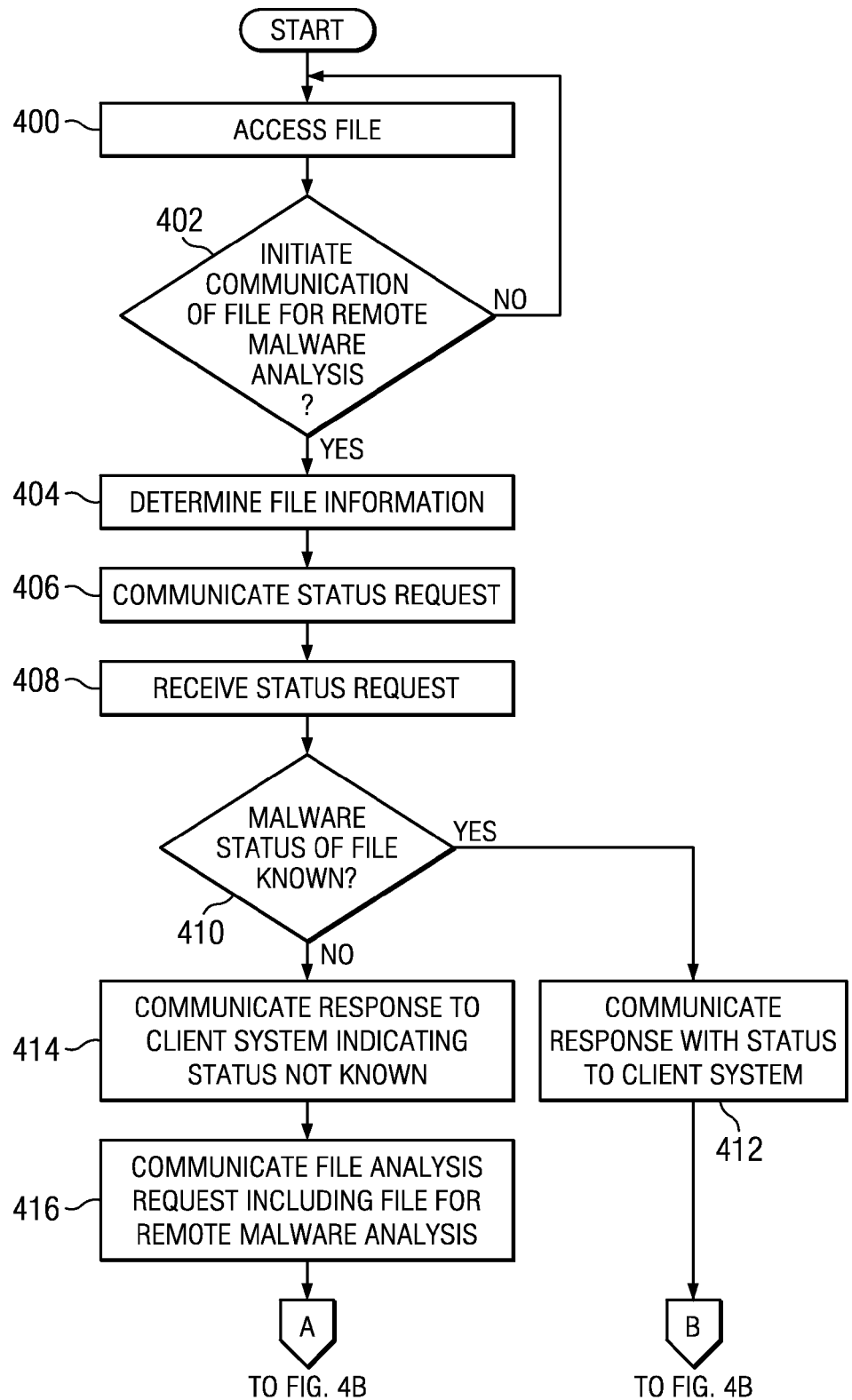
FIGS. 4A-4B illustrate an example method for providing a network-accessible malware analysis in which a callback request is submitted, according to certain embodiments of the present disclosure.
Figure 4B:
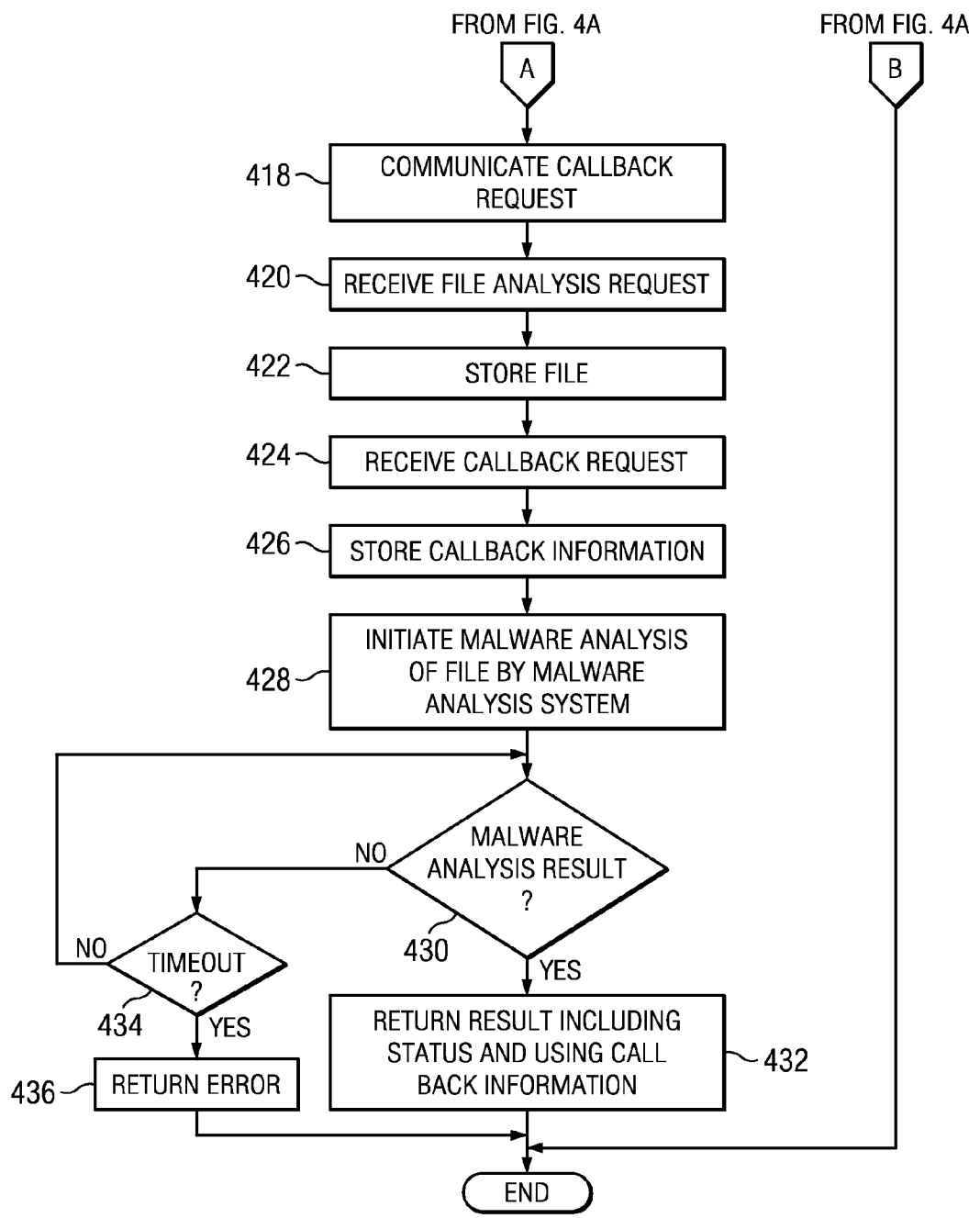

FIGS. 4A-4B illustrate an example method for providing a network-accessible malware analysis in which a callback request 122 is submitted, according to certain embodiments of the present disclosure. The method described with respect to FIGS. 4A-4B may be implemented in any suitable combination of software, firmware, and hardware. This example method is described with respect to system 100 of FIG. 1; however, the present disclosure contemplates this example method being performed using any suitable type of system according to particular needs. Additionally, although particular components of system 100 are described as performing particular steps of the following method, the present disclosure contemplates any suitable component performing these steps according to particular needs. In the example method of FIGS. 4A-4B, client system 102 submits a callback request to web services module 106 and/or malware analysis system 108 to request a response 124 that includes the result of the malware analysis on a file 116 substantially upon completion of the determination of that result by malware analysis system 108.

At step 400, client system 102 (e.g., application 114) accesses a file 116, possibly stored in memory 112 of client system 102. The present disclosure contemplates file 116 being made accessible to application 114 in any suitable manner. At step 402, application 114 may determine whether to initiate communication of file 116 for a remote malware analysis of file 116 to be performed. For example, application 114 may determine whether to communicate file 116, file information 118, and/or other suitable information to malware analysis system 108 for a remote malware analysis to be performed on file 116. If at step 402 application 114 determines not to initiate communication of file 116 and/or other suitable information to malware analysis system 108, then the method may return to step 400 for application 114 to access another file 116 (e.g., at that time or at a later time). If at step 402 application 114 determines to initiate communication of file 116 and/or other information to malware analysis system 108 for a remote malware analysis of file 116 to be performed by malware analysis system 108, then the method may proceed to step 404.

At step 404, application 114 may determine file information 118 associated with file 116. Example file information 118 is described above with reference to FIG. 1. At step 406, application 114 may communicate a status request 122 to web services system 106 (e.g., to web services module 130). For example, application 114 may communicate status request 122 to web services system 106 to determine whether a status for file 116 has already been determined by malware analysis system 108. In certain embodiments, the status request 122 communicated at step 406 may be considered a preliminary malware analysis request 122 that may be used determine whether malware analysis system 108 already has performed (or currently is performing) a malware analysis of file 116. This may filter traffic (e.g., file analysis requests 122) that actually are delivered to malware analysis system 108 for a malware analysis to be performed by first determining whether malware analysis system 108 already has determined (or currently is determining) a malware status for the file 116.

At step 408, web services module 130 may receive the status request 122 communicated by application 114. At step 410, web services module 130 may determine whether a malware status of file 116 is known. Web services module 130 may determine whether a malware status of file 116 is known in any suitable manner. In certain embodiments, to determine whether a malware status of file 116 is known, web service module 130 may access file information 118 included in status request 122 and compare the accessed file information 118 to information stored in storage module 138 to determine whether a malware status of file 116 is known. As a more particular example, web services module 130 may access a hash (or other identifier) of file 116 included in status request 122 and compare the hash (or other identifier) to historical detection data 140 (e.g., stored in storage module 138) to determine whether historical detection data 140 includes a status indexed by a hash (or other identifier) corresponding to the hash (or other identifier) of file 116.

If at step 410 web services module 130 determines that a malware status of file 116 is known, then at step 412 web services module 130 may communicate a response 124 to client system 102 that includes the malware status of file 116. For example, web services module 130 may determine that a malware analysis of file 116 has already been performed by malware analysis system 108 or that a malware analysis of file 116 currently is being performed by malware analysis system 108. In response to either of these determinations (or another appropriate determination), web services module 130 may notify client system 102 not to send file 116 to malware analysis system 108. This notification may be a part of or separate from the response 124 that includes the malware status of file 116.

If at step 410 web services module 130 determines that a malware status of file 116 is not known, then at step 414 web services module 130 may communicate a response 124 to client system 102 indicating that the malware status of file 116 is not known. For example, web services module 130 may determine that a malware analysis of file 116 has not already been performed by malware analysis system 108 or that a malware analysis of file 116 is not currently being performed by the malware analysis system 108. In response to either of these determinations (or another appropriate determination), web services module 130 may notify client system 102 to send file 116 to malware analysis system 108 (e.g., via web services system 106 if appropriate).

At step 416, client system 102 (e.g., application 114) may communicate a file analysis request 122 that includes file 116 for a remote malware analysis to be performed on the file 116 by malware analysis system 108. For example, in response to the indication that the malware status of file 116 is not known (i.e., at step 414), application 114 may communicate the file 116 to remote malware system 108 (e.g., via web services system 106) so that remote malware analysis system 108 can perform an analysis of the file 116. In other words, the malware analysis request 122 that includes file 116 may be communicated by client system 102 in response to the notification sent by web services module 130 for client system 102 to send file 116 to malware analysis system 108.

At step 418, client system 102 (e.g., application 114) may communicate a callback request 122 to web services system 106. Callback request 122 may include callback information 120, requesting that web services system 106 and/or malware analysis system 108 return a response 124 including the results of the malware analysis of file 116 once the results (e.g., a status) are known. In certain embodiments, when a callback request 122 is made, this response 124 may be communicated automatically by malware analysis system 108 and/or web services system 106 without further prompting by client system 102. Although described separately, the present disclosure contemplates the file analysis request 122 communicated at step 416 and the callback request 122 communicated at step 418 to be communicated as part of the same request 122. For example, the request 122 for remote malware analysis system 108 to perform an analysis of file 116 (the file analysis request including file 116) may also include callback information 120.

At step 420, web services system 106 and/or malware analysis system 108 may receive the file analysis request 122 including file 116, and at step 422 web services system 106 and/or malware analysis system 108 may store file 116 and any other suitable information of file analysis request 122. For example, malware analysis system 108 may receive file analysis request 122 via web services system 106, and web services system 106 and/or malware analysis system 108 may store a portion or all of file analysis request 122 in storage module 138. The stored information may include file 116, file information 118, and any other suitable information.

At step 424, web services system 106 and/or malware analysis system 108 may receive callback request 122, callback request 122 including callback information 120, and at step 426 web services system 106 and/or malware analysis system 108 may store callback information 120. For example, malware analysis system may receive callback request 122 via web services system 106, and web services system and/or malware analysis system 108 may store a portion or all of callback request 122 in storage module 138. The stored information may include callback information 120 and any other suitable information (e.g., a flag or other indication that may cause web services system 106 and/or malware analysis system 108 to automatically return a result of a malware analysis of file 116 once known.

At step 428, web services system 106 and/or malware analysis system 108 may initiate a malware analysis by malware analysis system 108 of file 116 for malware. For example, web services module 130 may forward file analysis request 122 to malware analysis system 108 to cause malware analysis system 108 to analyze file 116 for malware, and malware analysis system 108 may analyze file 116 in response to this file analysis request 122 (e.g., according to any queuing or other scheduling configurations of malware analysis system 108). The present disclosure contemplates malware analysis system 108 performing this malware analysis of file 116 in any suitable manner according to particular needs. A particular example implementation of malware analysis system 108 is described above with reference to FIGS. 2-3.

At step 430, web services system 106 and/or malware analysis system 108 may determine whether a result of the malware analysis of file 430 is known. For example, when malware analysis system 108 completes an analysis of file 116 (e.g., by determining a malware status of file 116), malware analysis system 108 may store the result (e.g., the determined malware status of file 116) in storage module 138 (e.g., as part of historical detection data 140) and may inform web services system 106 that the malware analysis of file 116 is complete (or of any other suitable status of the malware analysis of file 116 by malware analysis system 108). Additionally or alternatively, in certain embodiments, web services system 106 may check at any suitable interval whether a result of the malware analysis of file 430 has been determined. If after a predetermine threshold a result of the malware analysis of file 116 is still not completed, web services system 106 may return a status update to client system 102 using callback information 120, informing client system 102 that a result of a malware analysis is not yet known but that the analysis is ongoing (or has been discontinued, if appropriate).

If at step 430 web services module 106 and/or malware analysis system 108 determines that a result of the malware analysis of file 430 is known, then at step 432 web services system 106 and/or malware analysis system 108 may communicate a response 124 to client system 102 and the method may end. For example, as described above at step 430, when malware analysis system 108 completes an analysis of file 116 (e.g., by determining a malware status of file 116), malware analysis system 108 may store the result (e.g., the determined malware status of file 116) in storage module 138 (e.g., as part of historical detection data 140) and may inform web services system 106 that the malware analysis of file 116 is complete (or of any other suitable status of the malware analysis of file 116 by malware analysis system 108). This informing of web services system 106 may be a response 124 communicated by malware analysis system 108 to be passed on by web services system 106 to client system 102 according to the client system's callback information 120. The communicated response 124 may include the determined malware status of file 116. For example, response 124 may include a disposition resulting from the malware analysis performed on file 116, a recommended action, and/or any other suitable information. For example, a result 116 may conclusively indicate that the file 116 is known to contain malware, that the file 116 is suspected of malware (though such detection may not conclusively indicate that file 116 is known to contain malware), that file 116 is not malware, and/or any other suitable result of the malware analysis performed by malware analysis system 108.

If at step 432 malware analysis system 108 and/or web services system 106 determines that a result of the malware analysis of file 116 is not known, then at step 434 web services system 106 and/or malware analysis system 108 may determine whether a timeout has occurred. Such a timeout may include any suitable circumstance that results in the malware analysis of file 116 by malware analysis system 106 becoming stalled beyond an acceptable time period. If at step 432 web services system 106 and/or malware analysis system 108 determine that a timeout has occurred, then at step 436 web services system 106 and/or malware analysis system 108 may return an error and the method may end. For example, web services system 106 may notify (via a response 124) client system 102 that an error has occurred, potentially requesting that client system 102 resubmit the file analysis request 122 or another suitable request 122.

Although the method in FIGS. 4A-4B is illustrated as ending after step 432/436, it will be understood that the method may be performed substantially continuously (or at any other suitable interval) as client system 102 continues to monitor for files 116 for which a malware analysis is appropriate and as those files 116 or other related information is processed by system 100.

Figure 5A:
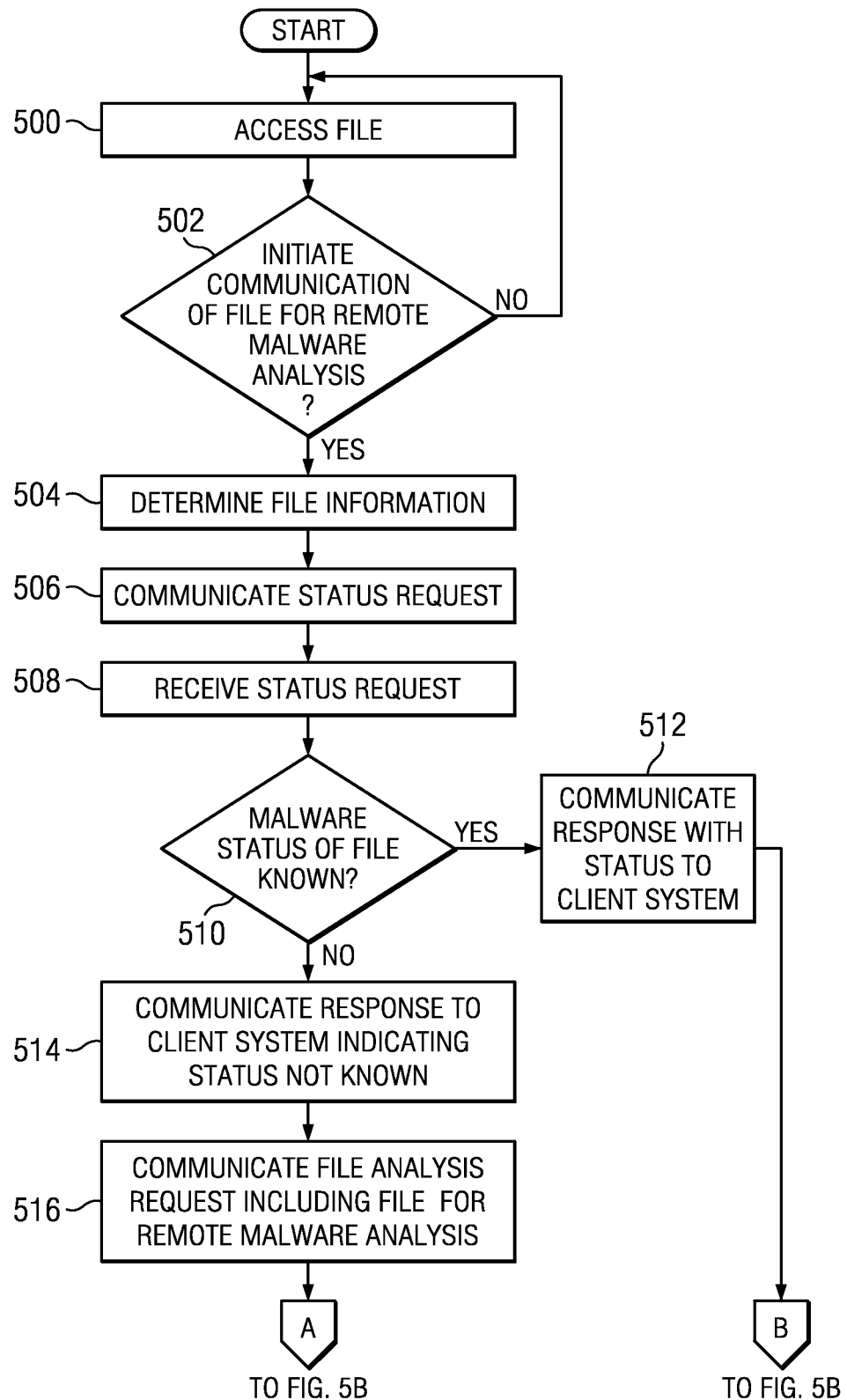
FIGS. 5A-5B illustrate an example method for providing a network-accessible malware analysis in which a status request is submitted, according to certain embodiments of the present disclosure.
Figure 5B:
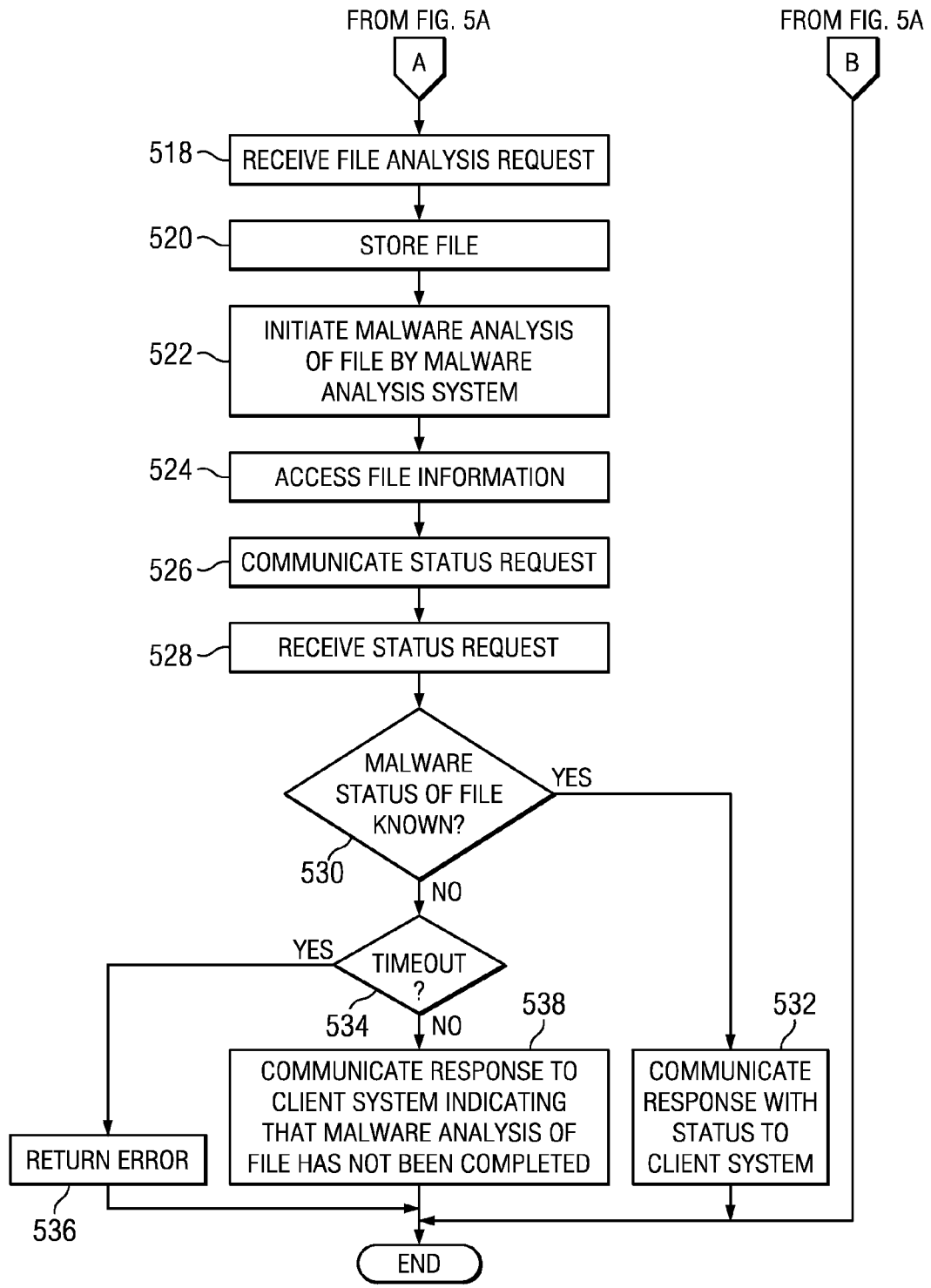

FIGS. 5A-5B illustrates an example method for providing a network-accessible malware analysis in which a status request 122 is submitted, according to certain embodiments of the present disclosure. The method described with respect to FIGS. 5A-5B may be implemented in any suitable combination of software, firmware, and hardware. This example method is described with respect to system 100 of FIG. 1; however, the present disclosure contemplates this example method being performed using any suitable type of system according to particular needs. Additionally, although particular components of system 100 are described as performing particular steps of the following method, the present disclosure contemplates any suitable component performing these steps according to particular needs.

In the example method of FIGS. 5A-5B, rather than submitting a callback request for receiving a result of the malware analysis, client system 102 submits a status request after submitting a file 116 to malware analysis system 108 to request the result of the malware analysis on the file 116. However, it should be understood that the present disclosure contemplates client system 102 using any suitable combination of callback requests and query requests. For example, client system 102 may submit a file 116 to malware analysis system 108 for a malware analysis to be performed on the file, along with callback information that the malware analysis system 108 may use to communicate a response to client system 102. Additionally, client system 102 may submit one or more query requests to malware analysis system 108 while waiting for the call back from malware analysis system 108, if appropriate.

At step 500, client system 102 (e.g., application 114) accesses a file 116, possibly stored in memory 112 of client system 102. The present disclosure contemplates file 116 being made accessible to application 114 in any suitable manner. At step 502, application 114 may determine whether to initiate communication of file 116 for a remote malware analysis of file 116 to be performed. For example, application 114 may determine whether to communicate file 116 and/or other suitable information to malware analysis system 108 for a remote malware analysis to be performed on file 116. If at step 502 application 114 determines not to initiate communication of file 116 and/or other suitable information to malware analysis system 108, then the method may return to step 500 for application 114 to access another file 116 (e.g., at that time or at a later time). If at step 502 application 114 determines to initiate communication of file 116 and/or other information to malware analysis system 108 for a remote malware analysis of file 116 to be performed by malware analysis system 108, then the method may proceed to step 504.

At step 504, client system 102 (e.g., application 114) may determine file information 118 associated with file 116. Example file information 118 is described above with reference to FIG. 1. At step 506, application 114 may communicate a status request 122 to web services system 106 (e.g., to web services module 130). For example, application 114 may communicate status request 122 to web services system 106 to determine whether a status for file 116 has already been determined by malware analysis system 108. In certain embodiments, the status request 122 communicated at step 506 may be considered a preliminary malware analysis request 122 that may be used determine whether malware analysis system 108 already has performed (or currently is performing) a malware analysis of file 116. This may filter traffic (e.g., file analysis requests 122) that actually are delivered to malware analysis system 108 for a malware analysis to be performed by first determining whether malware analysis system 108 already has determined (or currently is determining) a malware status for the file 116.

At step 508, web services module 130 may receive the status request 122 communicated by application 114. At step 510, web services module 130 may determine whether a malware status of file 116 is known. Web services module 130 may determine whether a malware status of file 116 is known in any suitable manner. In certain embodiments, to determine whether a malware status of file 116 is known, web service module 130 may access file information 118 included in status request 122 and compare the accessed file information 118 to information stored in storage module 138 to determine whether a malware status of file 116 is known. As a more particular example, web services module 130 may access a hash (or other identifier) of file 116 included in status request 122 and compare the hash (or other identifier) to historical detection data 140 (e.g., stored in storage module 138) to determine whether historical detection data 140 includes a status indexed by a hash (or other identifier) corresponding to the hash (or other identifier) of file 116.

If at step 510 web services module 130 determines that a malware status of file 116 is known, then at step 512 web services module 130 may communicate a response 124 to client system 102 that includes the malware status of file 116. For example, web services module 130 may determine that a malware analysis of file 116 has already been performed by malware analysis system 108 or that a malware analysis of file 116 currently is being performed by malware analysis system 108. In response to either of these determinations (or another appropriate determination), web services module 130 may notify client system 102 not to send file 116 to malware analysis system 108. This notification may be a part of or separate from the response 124 that includes the malware status of file 116.

If at step 510 web services module 130 determines that a malware status of file 116 is not known, then at step 514 web services module 130 may communicate a response 124 to client system 102 indicating that the malware status of file 116 is not known. For example, web services module 130 may determine that a malware analysis of file 116 has not already been performed by malware analysis system 108 or that a malware analysis of file 116 is not currently being performed by the malware analysis system 108. In response to either of these determinations (or another appropriate determination), web services module 130 may notify client system 102 to send file 116 to malware analysis system 108 (e.g., via web services system 106 if appropriate).

At step 516, client system 102 (e.g., application 114) may communicate a file analysis request 122 that includes file 116 for a remote malware analysis to be performed on the file 116 by malware analysis system 108. For example, in response to the indication that the malware status of file 116 is not known (i.e., at step 514), application 114 may communicate the file 116 to remote malware system 108 (e.g., via web services system 106) so that remote malware analysis system 108 can perform an analysis of the file 116. In other words, the malware analysis request 122 that includes file 116 may be communicated by client system 102 in response to the notification sent by web services module 130 for client system 102 to send file 116 to malware analysis system 108.

At step 518, web services system 106 and/or malware analysis system 108 may receive the file analysis request 122 including file 116, and at step 520 web services system 106 and/or malware analysis system 108 may store file 116 and any other suitable information of file analysis request 122. For example, malware analysis system 108 may receive file analysis request 122 via web services system 106, and web services system 106 and/or malware analysis system 108 may store a portion or all of file analysis request 122 in storage module 138. The stored information may include file 116, file information 118, and any other suitable information.

At step 522, web services system 106 and/or malware analysis system 108 may initiate a malware analysis by malware analysis system 108 of file 116 for malware. For example, web services module 130 may forward file analysis request 122 to malware analysis system 108 to cause malware analysis system 108 to analyze file 116 for malware, and malware analysis system 108 may analyze file 116 in response to this file analysis request 122 (e.g., according to any queuing or other scheduling configurations of malware analysis system 108). The present disclosure contemplates malware analysis system 108 performing this malware analysis of file 116 in any suitable manner according to particular needs. A particular example implementation of malware analysis system 108 is described above with reference to FIGS. 2-3.

At step 524, client system 102 (e.g., application 114) may access a portion or all of file information 118 determined for file 116. Example file information 118 is described above with reference to FIG. 1. At step 526, client system 102 (e.g., application 114) may communicate a status request 122 to web services system 106 (e.g., to web services module 130). For example, application 114 may communicate status request 122 to web services system 106 to determine whether a status for file 116 has been determined by malware analysis system 108. This status request 122 may be sent by client system 102 at any suitable regular or irregular interval, according to particular needs. In certain embodiments, the status request 122 communicated at step 524 may be considered a follow-up malware analysis request 122 that may be used determine whether malware analysis system 108 has performed (or currently is performing) the malware analysis of file 116 requested at step 516. For example, after submitting a malware analysis request 122 requesting that malware analysis system 108 perform a malware analysis of a file 116 (or at any other suitable time), client system 102 may communicate a status request 122 to request of malware analysis system 108 and/or web services system 106 a current status of the malware analysis of file 116. In certain embodiments, the status request 122 communicated at step 522 is substantially similar to the status request 122 communicated at step 506.

At step 528, web services system 106 and/or malware analysis system 108 may receive the status request 122 communicated by client system 102. For example, web services module 130 may receive, via network 104 and subsequent to receiving the file analysis request 122 for file 116 (the file analysis request 122 including file 116), the status request 122 communicated by client system 102, the status request 122 including file information 118 (e.g., file identification information) for file 116.

At step 530, web services system 106 may determine whether the malware status of file 116 is known. Web services module 130 may determine whether a malware status of file 116 is known in any suitable manner. In certain embodiments, to determine whether a malware status of file 116 is known, web service module 130 may access file information 118 included in status request 122 and compare the accessed file information 118 to information stored in storage module 138 to determine whether a malware status of file 116 is known. As a more particular example, web services module 130 may access a hash (or other identifier) of file 116 included in status request 122 and compare the hash (or other identifier) to historical detection data 140 (e.g., stored in storage module 138) to determine whether historical detection data 140 includes a status indexed by a hash (or other identifier) corresponding to the hash (or other identifier) of file 116.

If at step 530 web services module 130 determines that a malware status of file 116 is known, then at step 532 web services module 130 may communicate a response 124 to client system 102 that includes the determined malware status of file 116. For example, web services module 130 may determine that a malware a malware analysis of file 116 has been completed by malware analysis system 108 or that a malware analysis system of file 116 currently is being performed by malware analysis system 108. In response to either of those determinations (or another appropriate determination), web services module 130 may communicate response 124 for file 116 to client system 102. Response 124 may include a disposition resulting from the malware analysis performed on file 116, a recommended action, and/or any other suitable information. For example, a result 116 may conclusively indicate that the file 116 is known to contain malware, that the file 116 is suspected of malware (though such detection may not conclusively indicate that file 116 is known to contain malware), that file 116 is not malware, and/or any other suitable result of the malware analysis performed by malware analysis system 108.

If at step 530 web services module 130 determines that a result (e.g., a malware status) of the malware analysis of file 116 is not known, then at step 534 web services module 130 may determine whether a timeout has occurred. Such a timeout may include any suitable circumstance that results in the malware analysis of file 116 by malware analysis system 106 becoming stalled beyond an acceptable time period. If at step 534 web services system 106 and/or malware analysis system 108 determines that a timeout has occurred, then at step 536 web services system 106 and/or malware analysis system 108 may return an error and the method may end. For example, web services system 106 may notify (via a response 124) client system 102 that an error has occurred, potentially requesting that client system 102 resubmit the file analysis request 122 or another suitable request 122. If at step 534 web services system 106 and/or malware analysis system 108 determines that a timeout has not occurred, then at step 538 web service module 130 may communicated a response 124 to client system 102 indicating that the malware analysis of file 116 has not completed and the malware status of file 116 is not yet known. The method may end.

Although the method in FIGS. 5A-5B is illustrated as ending after step 532/536/538, it will be understood that the method may be performed substantially continuously (or at any other suitable interval) as client system 102 continues to monitor for files 116 for which a malware analysis is appropriate and as those files 116 or other related information is processed by system 100.

Although the methods of FIGS. 4 and 5 have been described separately, the present disclosure contemplates client system 102 providing a callback request and querying for status, if appropriate. For example, client system 102 may be configured to submit a callback request with a malware detection request, and to follow up with a query request if client system 102 does not receive a call back from web services system 106 within a predefined time period.

Regarding the methods described above with respect to FIGS. 4A-4B and 5A-5B, web services module 130 or another suitable component of system 100 may authenticating a user of client system 102 and/or client system 102. For example, client system 102 may provide one or more of a user name, a password, and a nonce. The present disclosure contemplates the use of this or another suitable authentication technique at one or more points throughout the method described below. For example, this authentication may be performed once when client system 102 initially establishes a connection to malware analysis system 108 using web services system 106. Additionally or alternatively, as another example, this authentication may be performed each time client system 102 submits a request or other communication using web services system 106.

Figure 6:
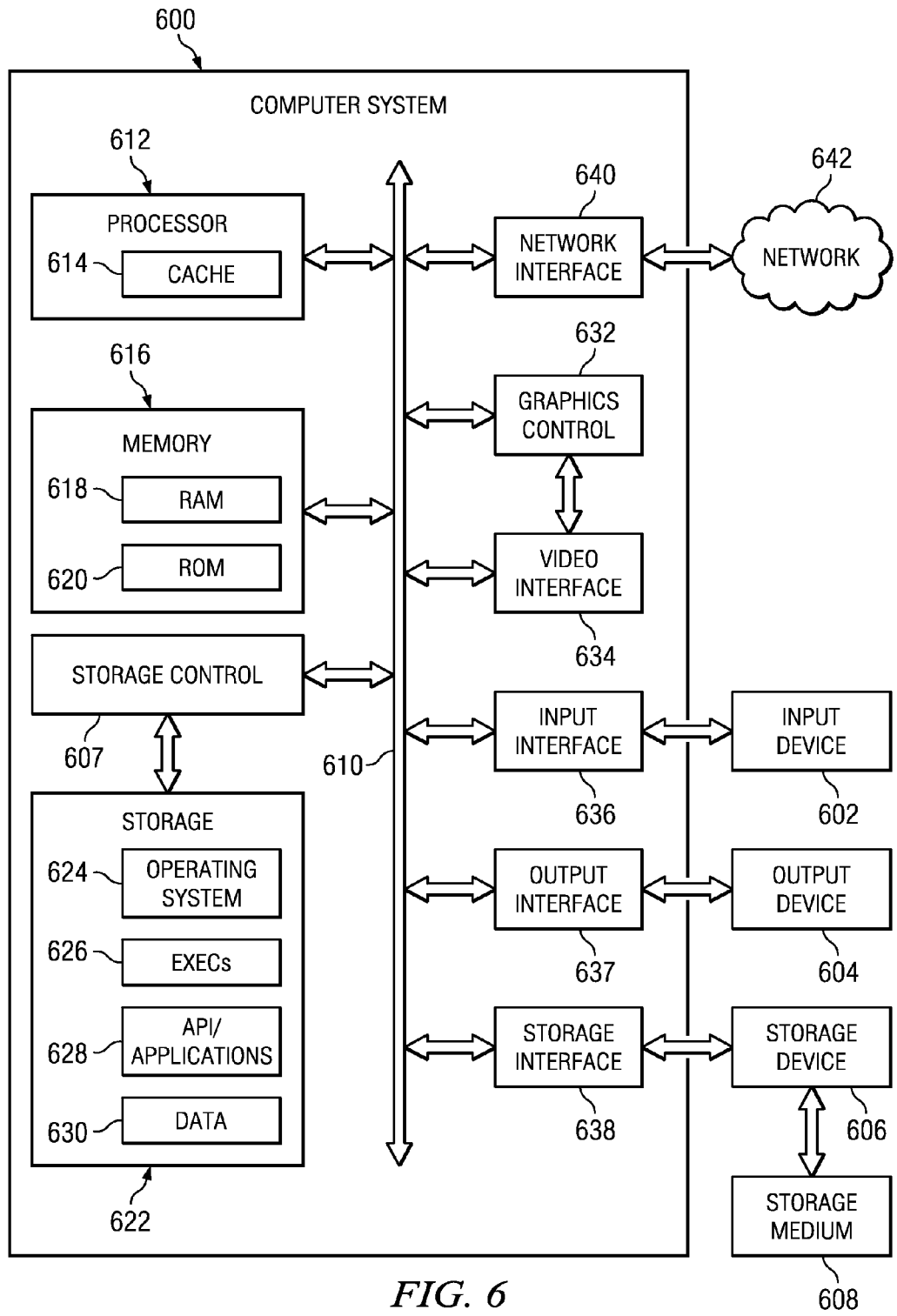
FIG. 6 illustrates an example computer system that may be used for one or more portions of systems for implementing the present disclosure.

FIG. 6 illustrates an example computer system 600 that may be used for one or more portions of systems for implementing the present disclosure. Although the present disclosure describes and illustrates a particular computer system 600 having particular components in a particular configuration, the present disclosure contemplates any suitable computer system having any suitable components in any suitable configuration. Moreover, computer system 600 may have take any suitable physical form, such as for example one or more integrated circuit (ICs), one or more printed circuit boards (PCBs), one or more handheld or other devices (such as mobile telephones or PDAs), one or more personal computers, one or more supercomputers, one or more servers, and one or more distributed computing elements. Portions or all of system 100 may be implemented using all of the components, or any appropriate combination of the components, of computer system 600 described below.

Computer system 600 may have one or more input devices 602 (which may include a keypad, keyboard, mouse, stylus, or other input devices), one or more output devices 604 (which may include one or more displays, one or more speakers, one or more printers, or other output devices), one or more storage devices 606, and one or more storage media 608. An input device 602 may be external or internal to computer system 600. An output device 604 may be external or internal to computer system 600. A storage device 606 may be external or internal to computer system 600. A storage medium 608 may be external or internal to computer system 600.

System bus 610 couples subsystems of computer system 600 to each other. Herein, reference to a bus encompasses one or more digital signal lines serving a common function. The present disclosure contemplates any suitable system bus 610 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-E), and Accelerated Graphics Port (AGP) bus.

Computer system 600 includes one or more processors 612 (or central processing units (CPUs)). A processor 612 may contain a cache 614 for temporary local storage of instructions, data, or computer addresses. Processors 612 are coupled to one or more storage devices, including memory 616. Memory 616 may include RAM 618 and ROM 620. Data and instructions may transfer bi-directionally between processors 612 and RAM 618. Data and instructions may transfer uni-directionally to processors 612 from ROM 620. RAM 618 and ROM 620 may include any suitable computer-readable storage media.

Computer system 600 includes fixed storage 622 coupled bi-directionally to processors 612. Fixed storage 622 may be coupled to processors 612 via storage control unit 607. Fixed storage 622 may provide additional data storage capacity and may include any suitable computer-readable storage media. Fixed storage 622 may store an operating system (OS) 624, one or more executables (EXECs) 626, one or more applications or programs 628, data 630 and the like. Fixed storage 622 is typically a secondary storage medium (such as a hard disk) that is slower than primary storage. In appropriate cases, the information stored by fixed storage 622 may be incorporated as virtual memory into memory 616. In certain embodiments, fixed storage 622 may include network resources, such as one or more storage area networks (SAN) or network-attached storage (NAS).

Processors 612 may be coupled to a variety of interfaces, such as, for example, graphics control 632, video interface 634, input interface 636, output interface 637, and storage interface 638, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 640 may couple processors 612 to another computer system or to network 642. Network interface 640 may include wired, wireless, or any combination of wired and wireless components. Such components may include wired network cards, wireless network cards, radios, antennas, cables, or any other appropriate components. With network interface 640, processors 612 may receive or send information from or to network 642 in the course of performing steps of certain embodiments. Certain embodiments may execute solely on processors 612. Certain embodiments may execute on processors 612 and on one or more remote processors operating together.

In a network environment, where computer system 600 is connected to network 642, computer system 600 may communicate with other devices connected to network 642. Computer system 600 may communicate with network 642 via network interface 640. For example, computer system 600 may receive information (such as a request or a response from another device) from network 642 in the form of one or more incoming packets at network interface 640 and memory 616 may store the incoming packets for subsequent processing. Computer system 600 may send information (such as a request or a response to another device) to network 642 in the form of one or more outgoing packets from network interface 640, which memory 616 may store prior to being sent. Processors 612 may access an incoming or outgoing packet in memory 616 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, compact discs (CDs) (such as CD-ROMs), field-programmable gate arrays (FPGAs), floppy disks, optical disks, hard disks, holographic storage devices, integrated circuits (ICs) (such as application-specific ICs (ASICs)), magnetic tape, caches, programmable logic devices (PLDs), RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 616 may include one or more tangible, computer-readable storage media embodying software and computer system 600 may provide particular functionality described or illustrated herein as a result of processors 612 executing the software. Memory 616 may store and processors 612 may execute the software. Memory 616 may read the software from the computer-readable storage media in mass storage device 616 embodying the software or from one or more other sources via network interface 640. When executing the software, processors 612 may perform one or more steps of one or more processes described or illustrated herein, which may include defining one or more data structures for storage in memory 616 and modifying one or more of the data structures as directed by one or more portions the software, according to particular needs.

In certain embodiments, the described processing and memory elements (such as processors 612 and memory 616) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 600 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A computer-implemented method, comprising:
   providing, at a malware analysis system, a web services interface implemented by a malware analysis module running as a web service, the web services interface being arranged to enable a user at a first computer system to access the malware analysis system through a web services module and to request malware analysis of a file by the malware analysis system;
   determining a file type of the first file including analyzing portions of file content of the first file and analyzing characters in a header file associated with the first file to determine the type of file even if a file extension of the first file has been falsified;
   comparing the determined file type of the first file to a plurality of file types in a first policy file to determine whether the first file is to be analyzed by the malware analysis system;
   receiving, from a first computer system via the web services interface, a first malware analysis request, the first malware analysis request comprising a first file to be analyzed for malware by the malware analysis system, a type of malware analysis to be performed on the first file, and an indication of the manner in which the first file was added to the first computer system;
   initiating a malware analysis, by the malware analysis module running as a web service on the malware analysis system, of the first file for malware, the malware analysis including the type specified in the analysis request and the malware analysis based on the manner in which the first file was added to the first computer system; and
   communicating, to the first computer system via the web services interface implemented by the malware analysis module running as a web service on the malware analysis system, a response for the first file determined by the malware analysis system, the response comprising an indication of whether the first file comprises malware.

2. The computer-implemented method of claim 1, further comprising:
   receiving, at the web services interface and prior to receiving the first malware analysis request comprising the first file, a preliminary malware analysis request, the preliminary malware analysis request comprising file identification information for the first file;
   determining, based on the received file identification information, that one or more of the following is true:
      a malware analysis of the first file has not already been performed by the malware analysis system; and
      a malware analysis of the first file currently is not being performed by the malware analysis system; and
   sending, by the web services interface, a notification notifying the first computer system to send the first file to the malware analysis system.

3. The computer-implemented method of claim 2, wherein the first malware analysis request is communicated by the first computer system to the web services interface, in response to the notification for the first computer system to send the first file to the malware analysis system.

4. The computer-implemented method of claim 2, wherein the file identification information for the first file comprises a hash value representing a hash of the first file.

5. The computer-implemented method of claim 1, further comprising:
   receiving, at the web services interface, a second malware analysis request from the first computer system, the second malware analysis request comprising second file identification information for a second file;

determining, by the web services interface, that one or more of the following is true based on the file identification for the second file:
a malware analysis of the second file has already been performed by the malware analysis system; and
a malware analysis of the second file currently is being performed by the malware analysis system; and notifying the first computer system by the web services interface not to send the second file for malware analysis to the malware analysis system.

6. The computer-implemented method of claim 1, further comprising receiving at the web services interface the results from the malware analysis system including information accessible by a human analyst using an analysis console and an advanced malware analysis workflow to be followed by a human analyst when the first file is determined to be suspected malware.

7. The computer-implemented method of claim 1, further comprising:
receiving from the first computer system at the web services interface, a callback request comprising an address and port number of the first computer system to use for communicating with the first computer system; and
communicating, to the first computer system by the web services interface, the response for the first file comprising the indication of whether the first file comprises malware using the address for communicating with the first computer system via the web services interface.

8. The computer-implemented method of claim 1, further comprising:
receiving, from the first computer system at the web services interface and subsequent to receiving the first malware analysis request comprising the first file, a second malware analysis request, the second malware analysis request being a status request and comprising file identification information for the first file; and
determining, by the web services interface in response to the second malware analysis request, whether the first file has been analyzed by the malware analysis system;
the communicating to the first computer system of the response for the first file being in response to a determination by the web services interface that the first file has been analyzed by the malware analysis system.

9. The computer-implemented method of claim 1, wherein the providing, by the web services interface, the first malware analysis request and the first file to the malware analysis system for initiating a malware analysis by the malware analysis system further comprises communicating the first file by the web services interface to the malware analysis system for the malware analysis to be performed by the malware analysis system on the first file.

10. The computer-implemented method of claim 1, further comprising authenticating the first computer system by the web services interface prior to receiving the first malware analysis request.

* * * * *

UNITED STATES PATENT AND TRADEMARK OFFICE
CERTIFICATE OF CORRECTION

PATENT NO. : 9,003,532 B2  
APPLICATION NO. : 13/233804  
DATED : April 7, 2015  
INVENTOR(S) : McDougal et al.

It is certified that error appears in the above-identified patent and that said Letters Patent is hereby corrected as shown below:

In The Specification

In column 5, line 9, delete "122" and insert --114--, therefor

In column 5, line 11, delete "122" and insert --114--, therefor

In column 5, line 13, delete "132" and insert --138--, therefor

In column 10, line 40-41, delete "checkFileStatusInput" and insert --CheckFileStatusInput--, therefor In column 17, line 34, delete "108" and insert --104--, therefor In column 19, line 16, delete "210" and insert --202--, therefor In column 26, line 62, delete "106" and insert --108--, therefor In column 30, line 39, delete "106" and insert --108--, therefor In column 31, line 40, delete "media" and insert --medium--, therefor In column 33, line 19, delete "616" and insert --606--, therefor Signed and Sealed this  
Ninth Day of February, 2016

Michelle K. Lee  
*Director of the United States Patent and Trademark Office*